United States Patent [19]

Sakai

[11] Patent Number: 5,641,212

[45] Date of Patent: Jun. 24, 1997

[54] DYNAMIC BEHAVIOR ESTIMATE SYSTEM OF AUTOMOTIVE VEHICLE

[75] Inventor: Hideki Sakai, Susono, Japan

[73] Assignee: Toyota Jidosha Kabushiki Kaisha, Aichi-ken, Japan

[21] Appl. No.: 556,455

[22] Filed: Nov. 15, 1995

[30] Foreign Application Priority Data

Dec. 14, 1994 [JP] Japan .................................. 6-310993

[51] Int. Cl.⁶ .............................. B60T 8/00; G01P 3/00
[52] U.S. Cl. ............................................. 303/147; 303/148
[58] Field of Search ................................. 303/140, 146, 303/147, 175, DIG. 6; 364/426.02, 426.04; 180/170, 197

[56] References Cited

U.S. PATENT DOCUMENTS

| | | | |
|---|---|---|---|
| 4,763,262 | 8/1988 | Leiber | 303/140 X |
| 4,809,183 | 2/1989 | Eckert | 303/140 X |
| 4,844,557 | 7/1989 | Giers | 303/140 |
| 4,898,431 | 2/1990 | Karnopp et al. | 303/146 |
| 5,001,640 | 3/1991 | Matsumoto et al. | 303/165 X |
| 5,149,177 | 9/1992 | Fujioka et al. | 303/144 |
| 5,333,058 | 7/1994 | Shiraishi et al. | 303/146 |
| 5,584,541 | 12/1996 | Sone et al. | 303/146 |

*Primary Examiner*—Josie Ballato
*Attorney, Agent, or Firm*—Oliff & Berridge

[57] ABSTRACT

A dynamic behavior estimate system of an automotive vehicle includes a parameter reading unit which reads an input signal indicative of one of vehicle behavior parameters when the vehicle operates in a curved path. A discriminating unit outputs a detection signal indicative of discrimination of an instability of the vehicle when an inference value from the above one of the vehicle behavior parameters exceeds a reference value. A slip angle detecting unit detects a maximum slip angle that can hold a lateral force of front or rear wheels of the vehicle below a critical value, and sets the reference value equal to the maximum slip angle. An inference value setting unit determines an inference value from the above one of the vehicle behavior parameters, and sets the value, used by the discriminating unit, equal to the inference value, thereby allowing the discriminating unit to detect whether the inference value exceeds the reference value.

15 Claims, 15 Drawing Sheets

DYNAMIC BEHAVIOR ESTIMATE SYSTEM OF AUTOMOTIVE VEHICLE

BACKGROUND OF THE INVENTION (1) Field of the Invention

The present invention generally relates to a dynamic behavior estimate system of an automotive vehicle, and more particularly to a dynamic behavior estimate system which discriminates an instability of an automotive vehicle when operating in a curved path, in accordance with one of vehicle behavior parameters, including a yaw rate, a lateral acceleration and a steering angle.

(2) Description of the Related Art

A conventional dynamic behavior estimate system discriminates an instability of an automotive vehicle when operating in a curved path, based on a relationship between a slip angle of wheels of the vehicle and a cornering force acting on the wheels, which is disclosed in, for example, U.S. Pat. No. 4,809,183.

Generally, the wheels of the vehicle have a proper road holding ability when the slip angle and the cornering force have a linear relation. The slip angle of a wheel is an angle of a central plane of the wheel to a forward running direction of the vehicle.

The conventional dynamic behavior estimate system, disclosed in the above publication, carries out a discrimination of the instability of the vehicle by detecting whether the slip angle and the cornering force have a linear relation with respect to each of the front wheels and the rear wheels of the vehicle.

More specifically, if the slip angle and the cornering force for both the front wheels and the rear wheels are detected to have a linear relation, the above dynamic behavior estimate system determines that no instability of the vehicle occurs or the vehicle operates in a stable condition. If the slip angle and the cornering force for the rear wheels are detected to have a non-linear relation, the above dynamic behavior estimate system determines that an instability of the vehicle, or "spin" of the vehicle, occurs. If the slip angle and the cornering force for the front wheels are detected to have a non-linear relation, the above dynamic behavior estimate system determines that an instability of the vehicle, or "drift-out" of the vehicle, occurs.

However, in order to detect the slip angle of the wheels, the above dynamic behavior estimate system is required to sense an absolute speed of the vehicle in the front-to-rear direction and an absolute speed of the vehicle in the left-to-right direction. Therefore, the above dynamic behavior estimate system must use an absolute vehicle speed sensing unit which is capable of sensing such absolute vehicle speeds, and the absolute vehicle speed sensing unit is expensive.

Accordingly, there is a problem that it is difficult for the above dynamic behavior estimate system to realize a discrimination of the instability of the vehicle with a low cost.

In addition, another method of detecting the slip angle of the wheels by using various vehicle behavior parameters including a vehicle speed, a lateral acceleration and a yaw rate, is known. In order to realize such a method, it is necessary that a dynamic behavior estimate system includes several sensors which sense the several vehicle parameters including at least the vehicle speed, the lateral acceleration and the yaw rate.

Further, in the above method of detecting the slip angle, calculations used to discriminate the instability of the vehicle are performed in accordance with detection signals output from the plurality of the sensors. The results of the calculations inevitably include errors of the detection signals from the sensors which may be accumulated. Therefore, the accuracy of the discrimination by the above method is likely to become worse, and it is difficult to realize an accurate discrimination of the instability of the vehicle.

SUMMARY OF THE INVENTION

An object of the present invention is to provide an improved dynamic behavior estimate system in which the above-described problems are eliminated.

Another object of the present invention is to provide a dynamic behavior estimate system which accurately discriminates an instability of the vehicle when operating in a curved path, in accordance with only one of vehicle behavior parameters including a yaw rate, a lateral acceleration and a steering angle.

Still another object of the present invention is to provide a dynamic behavior estimate system which carries out an accurate discrimination of the instability of the vehicle with a low cost.

The above-described objects of the present invention are achieved by a dynamic behavior estimate system which includes a parameter reading unit for reading a signal indicative of one of vehicle behavior parameters with respect to a vehicle when operating in a curved path; a discriminating unit for outputting a detection signal indicative of discrimination of an instability of the vehicle when a value from the above one of the vehicle behavior parameters indicated by the signal exceeds a reference value; a slip angle detecting unit, coupled to the discriminating unit, for detecting a maximum slip angle that can hold a lateral force of rear wheels of the vehicle below a critical value, and for setting the reference value equal to the maximum slip angle; and an inference value setting unit for determining an inference value from the above one of the vehicle behavior parameters indicated by the signal, and for setting the value, used by the discriminating unit, equal to the inference value, thereby allowing the discriminating unit to detect whether the inference value exceeds the reference value.

The above-described objects of the present invention are achieved by a dynamic behavior estimate system which includes a parameter reading unit for reading a signal indicative of one of vehicle behavior parameters with respect to a vehicle when operating in a curved path; a discriminating unit for outputting a detection signal indicative of discrimination of an instability of the vehicle when a value from the above one of the vehicle behavior parameters indicated by the signal exceeds a reference value; a slip angle detecting unit, coupled to the discriminating unit, for detecting a maximum slip angle that can hold a lateral force of front wheels of the vehicle below a critical value, and for setting the reference value equal to the maximum slip angle; and an inference value setting unit for determining an inference value from the above one of the vehicle behavior parameters indicated by the signal, and for setting the value, used by the discriminating unit, equal to the inference value, thereby allowing the discriminating unit to detect whether the inference value exceeds the reference value.

The dynamic behavior estimate system of the present invention is remarkably effective to speed up the discrimination of the instability of the vehicle. Also, it is possible to reduce the cost of the dynamic behavior estimate system because the discrimination of the instability of the vehicle can be carried out in accordance with only one of the vehicle behavior parameters. Further, it is possible to maintain a high accuracy of the discrimination of the instability of the vehicle.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given of various embodiments of the present invention with reference to the accompanying drawings.

Figure 5:
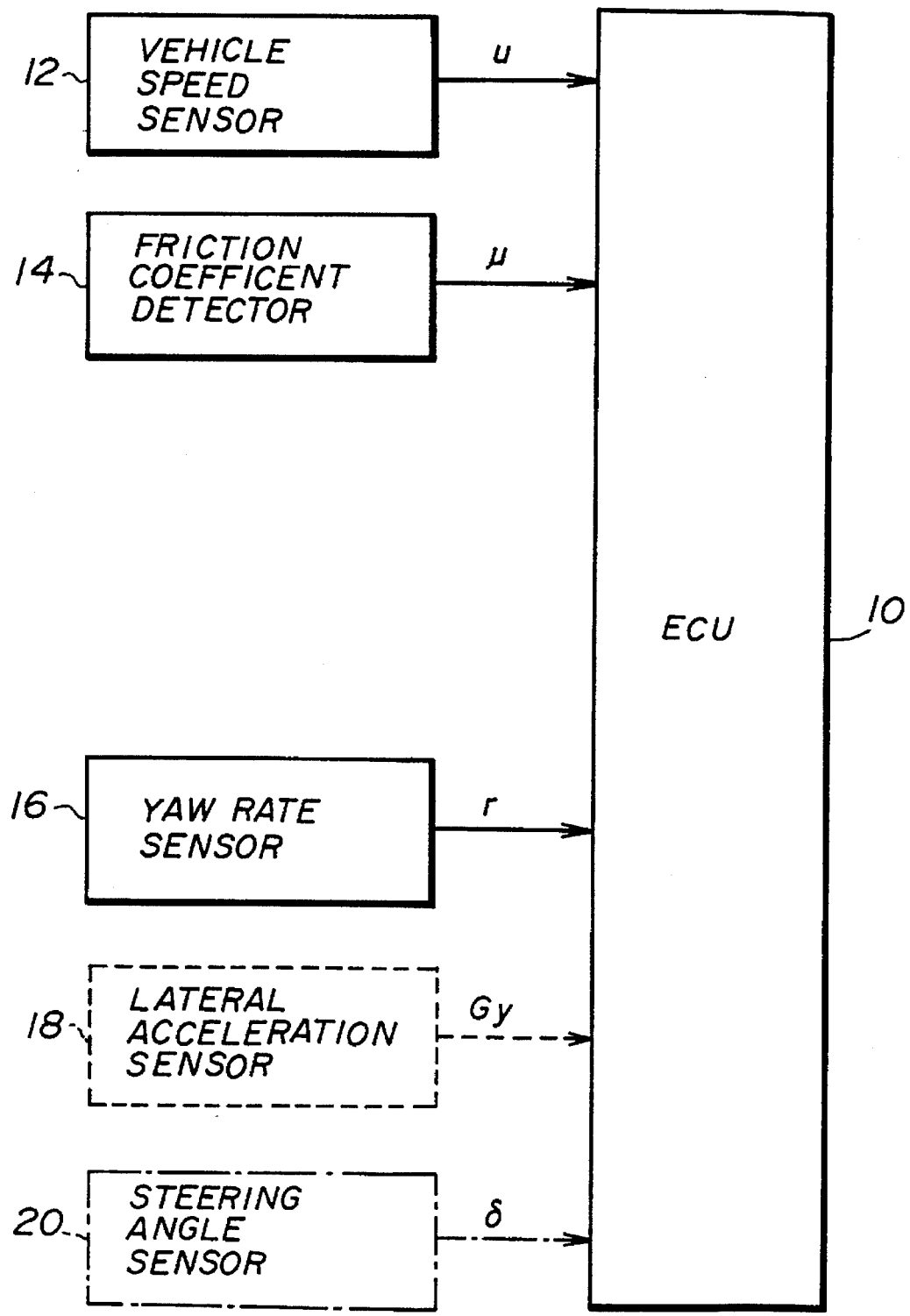
FIG. 5 is a block diagram of a dynamic behavior estimate system in a preferred embodiment of the present invention.

FIG. 5 shows a dynamic behavior estimate system in a preferred embodiment of the present invention. This dynamic behavior estimate system is applicable to various aspects of the present invention, each of which will be described later.

Referring to FIG. 5, the dynamic behavior estimate system comprises an electronic control unit (ECU) 10, a vehicle speed sensor (forward velocity sensor) 12, a friction coefficient detector 14, and one of three sensors: a yaw rate sensor 16; a lateral acceleration sensor 18; and a steering angle sensor 20. The dynamic behavior estimate system including the above elements is provided in an automotive vehicle. In this dynamic behavior estimate system, the vehicle speed sensor 12, the friction coefficient detector 14, and one of the sensors 16, 18 and 20 are connected to inputs of the ECU 10. Thus, the ECU 10 reads signals output by the sensors 12 and 14, and one of the sensors 16, 18 and 20.

In the above embodiment, the vehicle speed sensor 12 provides the ECU 10 with a signal indicative of a vehicle speed (forward velocity) "u". This signal is generated by the vehicle speed sensor 12 in accordance with a rotating speed of an output shaft of a transmission or in accordance with rotating speeds of wheels of the vehicle.

The friction coefficient detector 14 provides the ECU 10 with a signal indicative of a coefficient "μ" of friction between the tires of the vehicle and the road surface. A detection of the coefficient "μ" of friction is realized by the friction coefficient detector 14, for example, by reading it from a two-dimensional map in response to a cornering force (CF) and a self-aligning moment (SAM) which are calculated when the vehicle operates. In the two-dimensional map, values of the coefficient of friction which are predetermined in accordance with the relationship between the cornering force CF and the self-aligning moment SAM are stored.

Taking into account the relationship between the cornering force CF and the self-aligning moment SAM, when the CF has a constant value, the value of the SAM increases as the coefficient "μ" of friction increases with respect to one value of the CF. Thus, it is possible that the friction coefficient detector 14 detects the value of the coefficient "μ" of friction by reading it from the two-dimensional map if the value of the cornering force CF and the value of the self-aligning moment SAM are determined or calculated.

Figure 6:
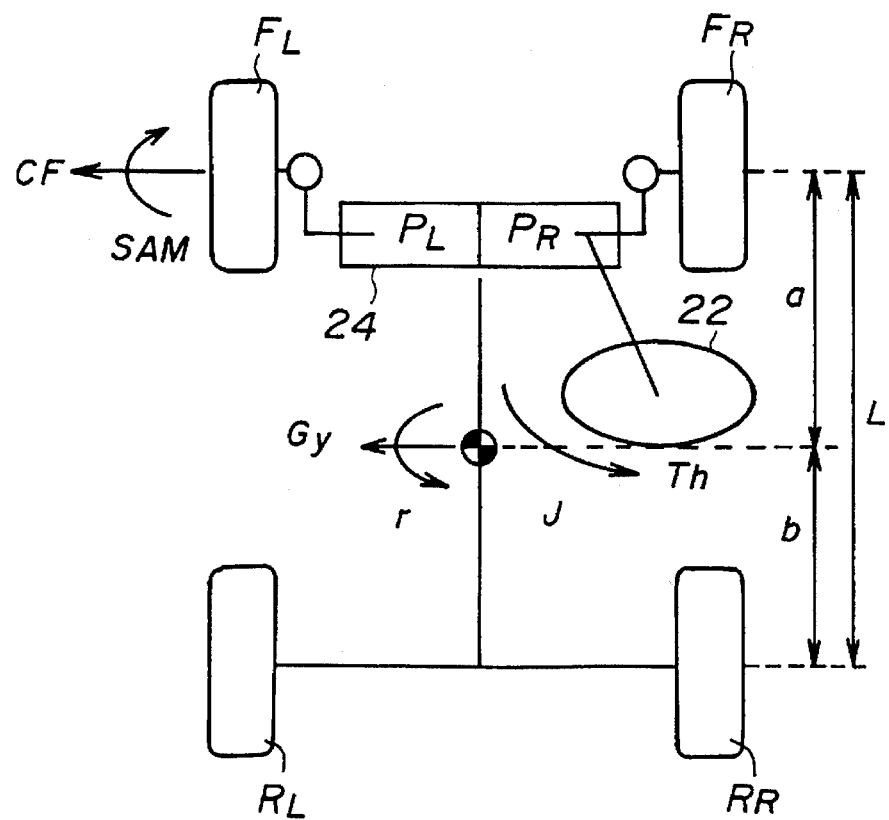
FIG. 6 is a diagram of a model of a vehicle which is used for determinations of a cornering force and a self-aligning moment.

FIG. 6 shows a model of a vehicle which is used for determinations of the cornering force CF and the self-aligning moment SAM. In FIG. 6, "Gy" indicates a lateral acceleration acting on the center of gravity of the vehicle, and "r" indicates a yaw rate (or yaw velocity) around a vertical axis passing through the center of gravity of the vehicle. The model of the vehicle includes a front left wheel FL, a front right wheel FR, a rear left wheel RL, a rear right wheel RR, a steering wheel 22, and a power cylinder 24. The front wheels FL and FR are connected to the steering wheel 22, and the steering of the vehicle is controlled by the steering wheel 22 through the front wheels FL and FR.

The cornering force CF acting on the front wheels FL and FR is represented by $$CF=(b \cdot m \cdot Gy + J \cdot dr/dt)/L \quad (1)$$

wherein:

Gy indicates the lateral acceleration;

b indicates a distance from the center of gravity of the vehicle to a rear axle of the vehicle;

m indicates a mass of the vehicle;

J indicates a yaw moment of inertia of the vehicle; and

L indicates a wheel base of the vehicle.

In the model shown in FIG. 6, a steering torque Th of the steering wheel 22 is assisted by the power cylinder 24, and it is transmitted from the power cylinder to the front wheels FL and FR. The power cylinder 24 has a left chamber and a right chamber. A steering fluid pressure PL in the left chamber is exerted on the front left wheel FL, and a steering fluid pressure PR in the right chamber is exerted on the front right wheel FR. The self-aligning moment SAM of the front wheels FL and FR is represented by $$SAM = N \cdot Th + k \cdot (PR - PL) \qquad (2)$$

where:

Th indicates the steering torque;

N indicates a steering gear ratio;

k indicates the product of an effective pressure-exerting area of the power cylinder multiplied by a knuckle arm length.

Accordingly, if the lateral acceleration Gy, the yaw rate r, the steering torque Th, and the steering fluid pressures PL and PR, with respect to the vehicle on which the above dynamic behavior estimate system is mounted, are detected, it is possible to calculate the value of the cornering force CF and the value of the self-aligning moment SAM in accordance with the above Equations (1) and (2). Once the cornering force CF and the self-aligning moment SAM are calculated, an appropriate inference value of the coefficient "$\mu$" of the friction can be determined in accordance with the results of the calculations. Thus, the above-mentioned friction coefficient detector 14 is realized by using this method.

There are other methods to detect the value of the coefficient "$\mu$" of the friction. One of such methods is to detect the value of the coefficient "$\mu$" of the friction based on a longitudinal acceleration (front to rear direction) acting on the vehicle when an antilock brake system (ABS) of the vehicle operates. Another method is to detect the value of the coefficient "$\mu$" of the friction from a signal output from a non-contact road friction sensor. The above-mentioned friction coefficient detector 14 can also be realized by using one of these methods.

In the above embodiment, shown in FIG. 5, the yaw rate sensor 16 provides the ECU 10 with a signal indicative of the yaw rate (or yaw velocity) "r" around the vertical axis passing through the center of gravity of the vehicle. The lateral acceleration sensor 18 provides the ECU 10 with a signal indicative of the lateral acceleration "Gy" acting laterally on the center of gravity of the vehicle. The steering angle sensor 20 provides the ECU 10 with a signal indicative of the steering angle "$\delta$" of the steering wheel 22.

Since one of the yaw rate sensor 16, the lateral acceleration sensor 18 and the steering angle sensor 20 is connected to the ECU 10, a signal indicative of one of the vehicle behavior parameters with respect to the vehicle when operating in a curved path is read by the ECU 10.

Generally, an instability or excessive rear drift of the automotive vehicle takes places if a lateral force acting on the rear wheels of the vehicle when turning in a curved path exceeds a critical value. Hereinafter, this instability is called "spin". Also, an instability or excessive front drift of the vehicle takes place if a lateral force acting on the front wheels of the vehicle when turning in a curved path exceeds a critical value. Hereinafter, this instability is called "drift-out".

The speed control apparatus of the present invention discriminates "spin" or "drift-out" of the vehicle by detecting whether the rear or front wheels of the vehicle have a proper road holding ability to resist to slip.

Figure 7:
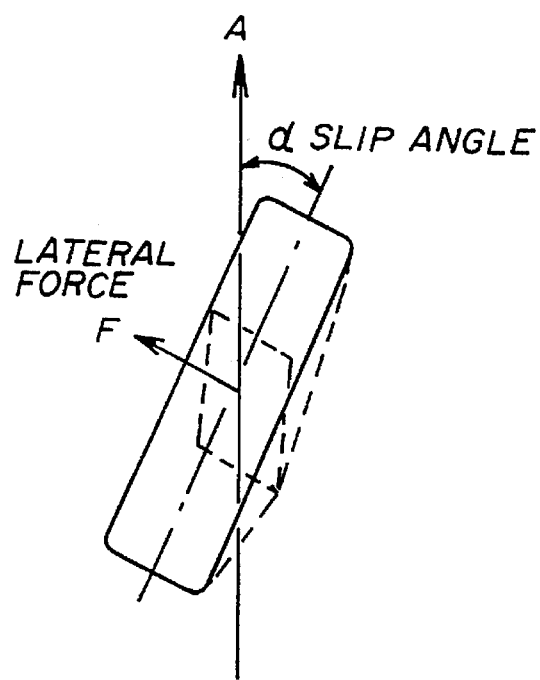
FIG. 7 is a diagram for explaining a lateral force acting on a wheel when the wheel is at a slip angle to a forward running direction of the vehicle.

FIG. 7 shows a lateral force (side force) "F" acting on a wheel of an automotive vehicle when the wheel is at a slip angle "$\alpha$" to a forward running direction. The forward running direction of the vehicle is indicated by an arrow "A". The slip angle $\alpha$ is an angle between the forward running direction of the vehicle and a centerline of the wheel, as shown in FIG. 7. The lateral force F is produced due to elastic deformation of the tire of the wheel to the road surface.

Figure 8:
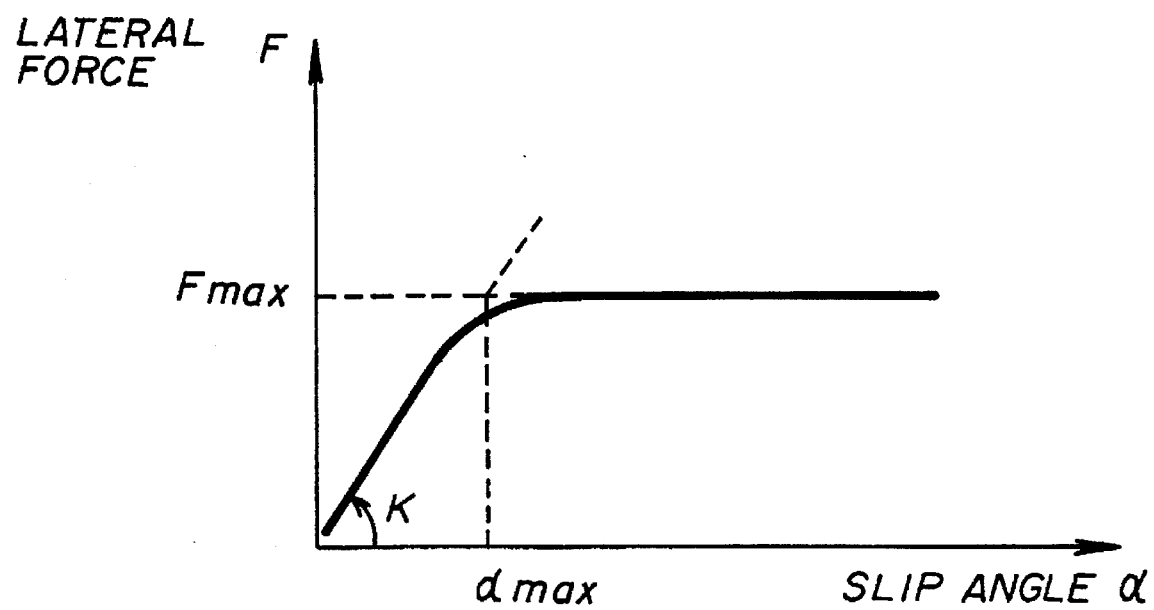
FIG. 8 is a chart of a relationship between the slip angle and the lateral force.

FIG. 8 shows a relationship between the slip angle "$\alpha$" and the lateral force "F". As shown in FIG. 8, it is observed that the lateral force F changes in proportion with the slip angle $\alpha$ when the slip angle $\alpha$ is below a maximum slip angle "$\alpha_{max}$". The slip angle $\alpha$ and the lateral force F in this range have a linear relation. It is also observed that the lateral force F does not further increase from a critical value (an upper limit of the lateral force indicated by "Fmax") when the slip angle $\alpha$ is above the maximum slip angle "$\alpha_{max}$". The slip angle $\alpha$ and the lateral force F in this range have a non-linear relation. If a lateral force F that exceeds the critical value acts on the wheel, an instability of the vehicle takes place, as described above.

Accordingly, if it is accurately detected whether an actual slip angle of the wheel of the vehicle is above the maximum slip angle "$\alpha_{max}$", it is possible to determine whether the wheel has a proper road holding ability to resist to slip when the vehicle operates in a curved path.

In the chart shown in FIG. 8, the gradient "K" in the linear range of the slip angle and the lateral force means an equivalent cornering power with respect to the wheel that indicates a magnitude of a lateral force per unit slip angle. The equivalent cornering power depends on the road holding ability of the wheel, and it is varied according to the wheel characteristic and the wheel load.

In addition, the upper limit "Fmax" of the lateral force means a maximum frictional force between the tire and the road surface. The maximum frictional force depends on the road friction coefficient "$\mu$" and the road holding ability of the wheel, and it is varied according to the wheel characteristic, the wheel load and the road friction coefficient "$\mu$".

Figure 9:
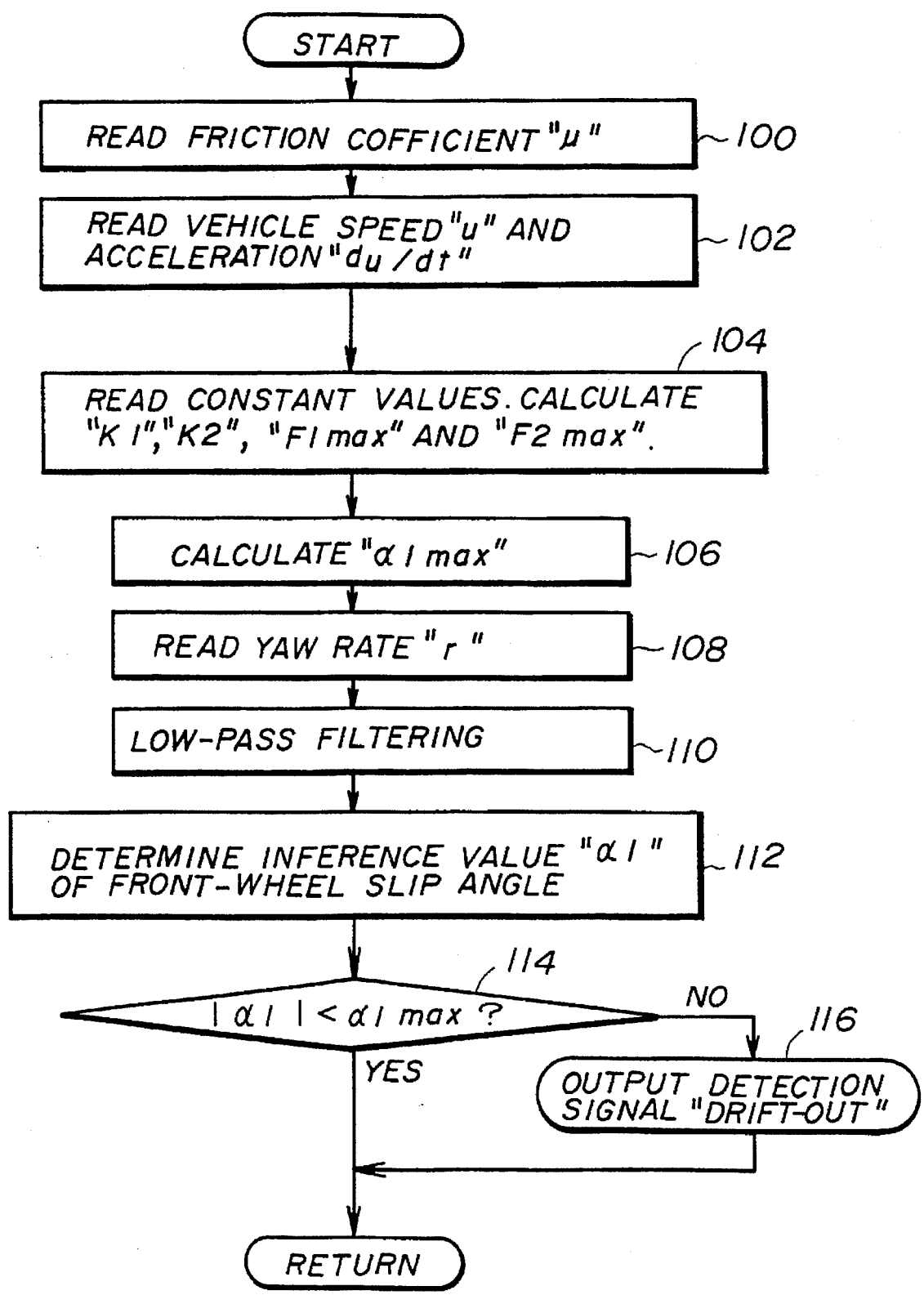
FIG. 9 is a flow chart for explaining a discrimination of "drift-out" of the vehicle performed by a control unit using a signal output from a yaw rate sensor.

FIG. 9 shows a discrimination of "drift-out" of the vehicle performed by the ECU 10 using a signal output from the yaw rate sensor 16. As one aspect of the present invention, the ECU 10 discriminates an instability of the vehicle from a yaw rate signal output from the yaw rate sensor 16. A slip angle "$\alpha 1$" of the front wheels is compared with a maximum slip angle "$\alpha 1_{max}$", and the discrimination is performed based on a result of the comparison.

When the routine shown in FIG. 9 starts, the ECU 10, at step 100, reads a signal indicative of the friction coefficient "$\mu$" generated by the friction coefficient detector 14. Step 102 reads a signal indicative of the vehicle speed "u" generated by the vehicle speed sensor 12, and reads an acceleration "du/dt" derived from the vehicle speed "u". The acceleration "du/dt" of the vehicle is determined from a change in the vehicle speed "u" within a predetermined time.

The ECU 10, at step 104, reads various constant values of the vehicle, and calculates a front-wheel cornering power K1, a rear-wheel cornering power K2, a maximum lateral force "F1max" of the front wheels and a maximum lateral force "F2max" of the rear wheels, by using the constant values.

The constant values read at this step 104 includes: a mass "m" of the vehicle; a height "h" of the center of gravity of the vehicle; a wheel base "L" of the vehicle; a distance "a" from the center of gravity of the vehicle to a front axle; a distance "b" from the center of gravity of the vehicle to a rear axle; a yaw moment "J" of inertia of the vehicle; a reference friction coefficient $\mu_o$; reference maximum lateral forces "F1max$_o$" and "F2max$_o$" when no load change is made and the road friction $\mu=\mu_o$; a front-wheel equivalent cornering power "K1$_o$"; and a rear-wheel equivalent cornering power "K2$_o$".

The front-wheel cornering power "K1", the rear-wheel cornering power "K2", the front-wheel maximum lateral force "F1max", and the rear-wheel maximum lateral force "F2max" are calculated by the ECU 10 at this step 104 in accordance with the following equations:

$$F1max=\mu \cdot F1max_o/\mu_o-\mu \cdot (mh/L) \cdot du/dt \quad (3)$$

$$F2max=\mu \cdot F2max_o/\mu_o+\mu \cdot (mh/L) \cdot du/dt \quad (4)$$

$$K1=K1_o \{mgb/L-(mh/L) \cdot du/dt\} \cdot /(mgb/L) \quad (5)$$

$$K2=K2_o \{mga/L-(mh/L) \cdot du/dt\}/(mga/L) \quad (6)$$

The second terms in the above Equations (3) and (4) show influences on the maximum lateral force by load changes occurring when the vehicle is in acceleration or deceleration. The above Equations (5) and (6) show influences on the equivalent cornering powers by load changes occurring when the vehicle is in acceleration or deceleration.

After the above step 104 is performed, the ECU 10, at step 106, calculates a front-wheel maximum slip angle "$\alpha 1_{max}$". This calculation is performed based on an approximation that a front-wheel maximum slip angle "$\alpha 1_{max}$" that can hold the lateral force of the front wheels below the critical value can be determined from the maximum lateral force "F1max" and the front-wheel cornering power "K1", as shown in FIG. 8.

At this step 106, the front-wheel maximum slip angle "$\alpha 1_{max}$" is calculated in accordance with the equation:

$$\alpha 1_{max}=F1max/K1. \quad (7)$$

After the front-wheel maximum slip angle "$\alpha 1_{max}$" is determined, it is detected whether the actual slip angle of the front wheels is above the maximum slip angle "$\alpha 1_{max}$". This will make it possible to discriminate the "drift-out" of the vehicle when operating in a curved path.

The ECU 10, at step 108, reads a signal indicative of the yaw rate "r" generated by the yaw rate sensor 16. Step 110 performs a low-pass filtering for the signal output from the yaw rate sensor 16. The low-pass filter has a cut-off frequency fm, and noises, or irrelevant signals having high frequencies above the cut-off frequency fm, are eliminated from the yaw rate signal read by the ECU 10. In the above embodiment, the cut-off frequency of the low pass filter is about 3 Hz, which is considered the maximum frequency produced due to the vehicle operator.

After the above step 110 is performed, the ECU 10, at step 112, determines an inference value "$\alpha 1$" of the front-wheel slip angle from the yaw rate "r".

Figure 10:
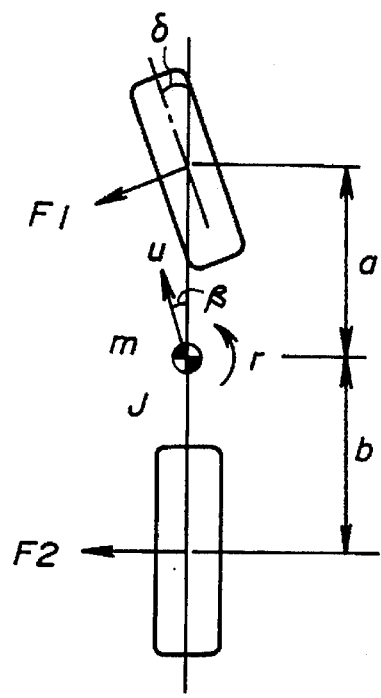
FIG. 10 is a diagram of a model of a vehicle which is used for a determination of an inference value of a slip angle of a wheel from one of the vehicle behavior parameters.
Figure 11:
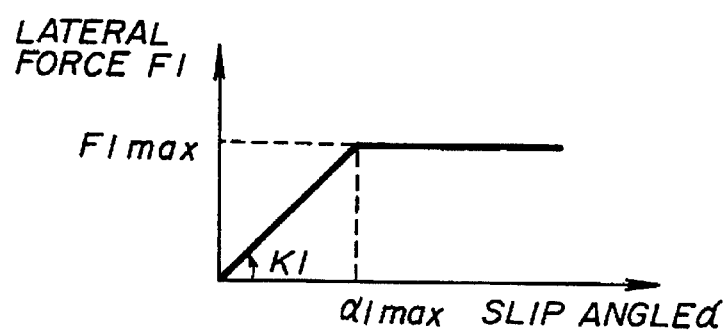
FIG. 11 is a chart of a relationship between the slip angle of a front wheel and the lateral force thereof.
Figure 12:
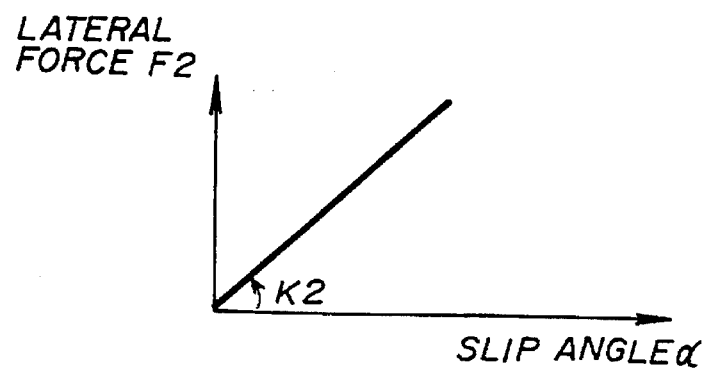
FIG. 12 is a chart of a relationship between the slip angle of a rear wheel and the lateral force thereof.

Referring to FIGS. 10, 11 and 12, a determination of an inference value "$\alpha 1$" of the front-wheel slip angle performed by the ECU 10 from the yaw rate "r" which is one of the vehicle behavior parameters will be described.

FIG. 10 shows a model of a vehicle which is used for the determination of an inference value "$\alpha 1$" from the yaw rate "r". In FIG. 10, "m" is the mass of the vehicle, "a" is the distance from the vehicle's center of gravity of to the front axle, "b" is the distance from the vehicle's center of gravity to the rear axle, "J" is the vehicle's yaw moment of inertia, "u" is the vehicle speed, "$\beta$" is the angle of the forward running direction to the vehicle centerline, "r" is the yaw rate, and "$\delta$" is the steering angle. It is assumed that the vehicle model in FIG. 10 operates in a curved path.

The equations for motion of the vehicle model in FIG. 10, which are used to determine an inference value of a front-wheel slip angle, can be defined as follows:

$$mu \, (\beta s+r)=F1+F2 \quad (8)$$

$$Jrs = aF1 - bF2 \quad (9)$$

$$F1 = K \cdot \alpha 1 \quad (0 \leq \alpha 1 \leq \alpha 1_{max}) \quad (10)$$

$$\phantom{F2} = F1max \quad (\alpha 1_{max} \leq \alpha 1)$$
$$F2 = K2 \cdot \alpha 2 \quad (11)$$

$$\alpha 1=\delta-\beta-ar/u \quad (12)$$

$$\alpha 2=br/u-\beta \quad (13)$$

where "s" is a differential notation, "F1" is a lateral force acting on the front wheel, and "F2" is a lateral force acting on the rear wheel.

The above Equation (8) shows the equilibrium with respect to the lateral motion of the vehicle model and the lateral forces. The above Equation (9) shows the equilibrium with respect to the angular momentum of the vehicle model.

The above Equation (10) represents a relationship between the slip angle "$\alpha$" and the lateral force "F1" of the front wheel, and the above Equation (11) represents a relationship between the slip angle "$\alpha$" and the lateral force "F2" of the rear wheel. The charts shown in FIG. 11 and FIG. 12 are indicated by linear approximation of the slip-angle vs. lateral-force relationships of the front wheel and the rear wheel, respectively. In the above embodiment, such approximations are used in order to simplify the calculations to determine the inference value "$\alpha$".

From the above Equations (8) through (13), the inference value $\alpha 1$ of the front-wheel slip angle can be expressed by using a transfer function Hr(s) and the yaw rate r, as follows.

$$\alpha 1=Hr(s) \cdot r \quad (14)$$

$$Hr(s)=\{Jmus^2+(J+mb^2)s+mubK2\}/K1(muas+LK2) \quad (15)$$

By substituting the constant values and the calculated values obtained at the step 104 into the above Equation (15), a specific value of the transfer function Hr(s) is determined. The specific value of the Hr(s) is multiplied by the yaw rate r read at the step 108, so that the inference value $\alpha 1$ is determined by the above Equation (14).

Thus, the ECU 10, at the step 112, determines the inference value $\alpha 1$ of the front-wheel slip angle from the yaw rate r, as in the procedure shown in FIG. 9.

After the inference value $\alpha 1$ is determined, the ECU 10, at step 114, detects whether the absolute value $|\alpha 1|$ of the determined inference value is smaller than the maximum slip angle $\alpha 1_{max}$. The inference value $\alpha 1$ determined at the step 112 may be positive or negative depending on the direction of the turning of the vehicle. For this reason, in this step 114, the absolute value of the determined inference value is compared with the maximum slip angle.

If the result at the step 114 is affirmative ($|\alpha 1|<\alpha 1_{max}$), it is determined that no "drift-out" of the vehicle occurs since the slip angle $\alpha$ and the lateral force F of the front wheel have a linear relation and the front wheel currently has a proper road holding ability. The procedure shown in FIG. 9 ends without outputting a detection signal indicative of "drift-out" of the vehicle.

If the result at the step 114 is negative ($|\alpha 1| \geq \alpha 1_{max}$), it is determined that "drift-out" of the vehicle occurs since the slip angle $\alpha$ and the lateral force F of the front wheel have a nonlinear relation and the front wheel currently loses a proper road holding ability. The ECU 10, at step 116, outputs a detection signal indicative of "drift-out" of the vehicle. After the step 116 is performed, the procedure shown in FIG. 9 ends.

Accordingly, the discrimination of "drift-out" of the vehicle when operating in a curved path is performed by the ECU 10 using the yaw rate "r" only. In the dynamic behavior estimate system in this embodiment, only the yaw rate sensor 16 is required and the lateral acceleration sensor 18 and the steering angle sensor 20 are not required. It is possible to carry out the discrimination of "drift-out" of the vehicle with a low cost. Since errors of the output signals of the sensors 16, 18 and 20 relating to the vehicle behavior parameters do not accumulate in this embodiment, it is possible to ensure an accurate discrimination of instability of the vehicle.

In the above-described embodiment, the Equations (14) and (15) are derived from the Equations (8) through (13) by taking into account the transfer function Hr(s) with respect to the yaw rate r. Similarly, the equations used to determine the inference value $\alpha 1$ of the front-wheel slip angle from the lateral acceleration Gy can be derived from the Equations (8) through (13) by using a transfer function HGy(s) and the lateral acceleration Gy, as follows.

$$\alpha 1 = HGy(s) \cdot Gy \qquad (16)$$

$$HGy(s) = \{Jmus^2 + (J+mb)K2s^2mubK2\}/K1(Jmus^2+bLK2s+uLK2) \qquad (17)$$

Similarly, the equations used to determine the inference value $\alpha 1$ of the front-wheel slip angle from the steering angle $\delta$ can be derived from the above Equations (8) through (13) by using a transfer function H$\delta$(s) and the steering angle $\delta$, as follows.

$$\alpha 1 = H\delta(s) \cdot \delta \qquad (18)$$

$$H\delta(s) = u\{Jmus^2 + (J + mb^2)K2 + mubK2\}/[Jmu^2s^2 + \qquad (19)$$
$$\{(a^2K1 + b^2K2)mu + (K1 + K2)Ju\}s +$$
$$\{LK1^2K2 + (bK2 - aK1)mu\}^2]$$

Therefore, it is possible that the dynamic behavior estimate system of the present invention carries out a discrimination of "drift-out" of the vehicle from the lateral acceleration Gy only and a discrimination of "drift-out" of the vehicle from the steering angle $\delta$ only, in the same manner as in the above-described embodiment.

Figure 13:
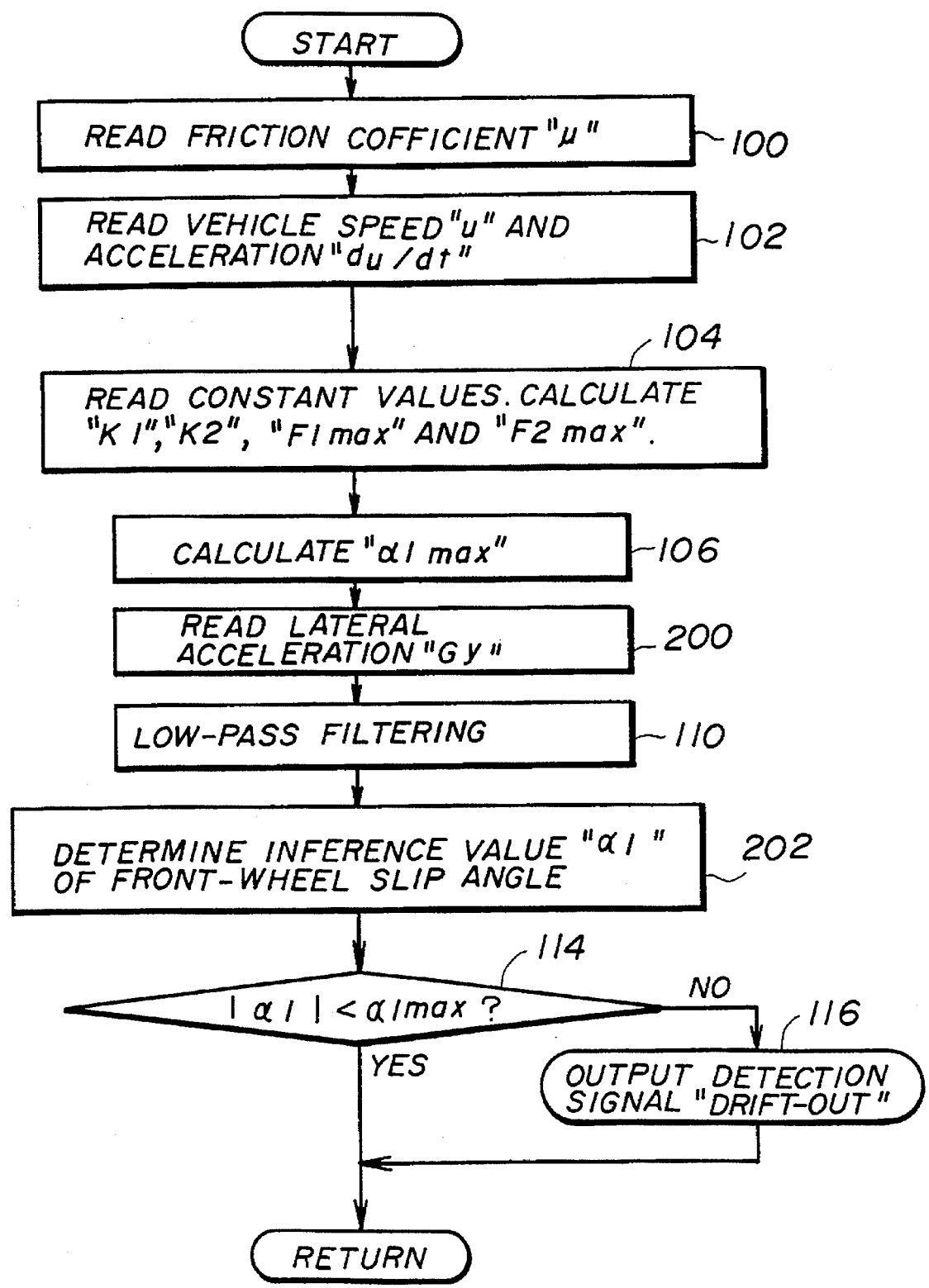
FIG. 13 is a flow chart for explaining a discrimination of "drift-out" of the vehicle performed by a control unit using a signal output from a lateral acceleration sensor.
Figure 14:
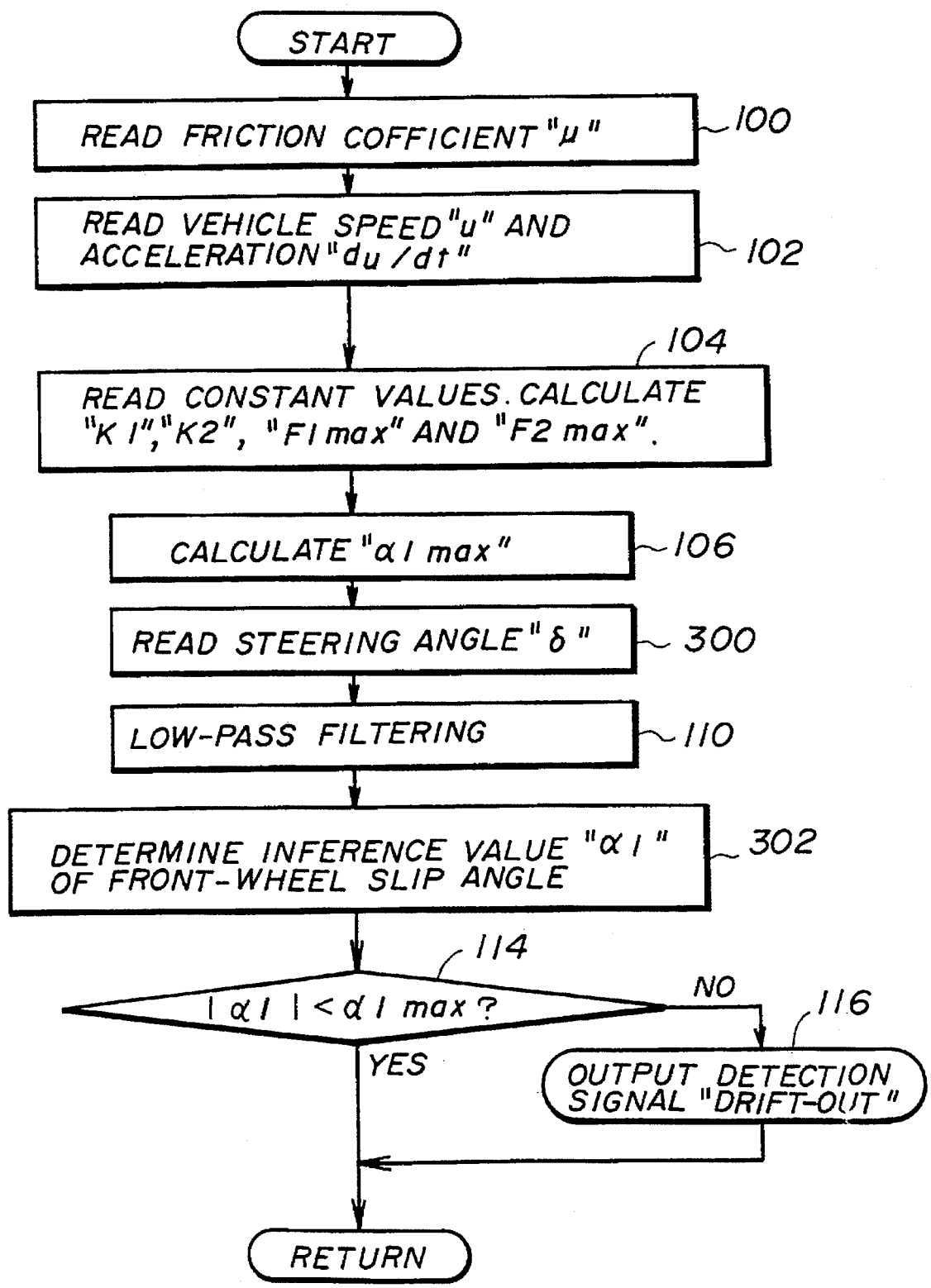
FIG. 14 is a flow chart for explaining a discrimination of "drift-out" of the vehicle performed by a control unit using a signal output from a steering angle sensor.

FIG. 13 shows a discrimination of "drift-out" of the vehicle performed by the ECU 10 using a lateral acceleration signal (Gy) output from the lateral acceleration sensor 18. FIG. 14 shows a discrimination of "drift-out" of the vehicle performed by the ECU 10 using a steering angle signal ($\delta$) output from the steering angle sensor 20. In FIGS. 13 and 14, the steps which are the same as corresponding steps in FIG. 9 are designated by the same reference numerals, and a description thereof will be omitted.

In FIG. 13, the procedure to discriminate "drift-out" of the vehicle from the lateral acceleration signal (Gy) includes the steps 100, 102, 104 and 106, the step 110, and the steps 114 and 116 which are the same as corresponding steps of the procedure in FIG. 9.

In this procedure, after the steps 100-106 are performed, the ECU 10, at step 200, reads a signal indicative of the lateral acceleration Gy generated by the lateral acceleration sensor 18.

After the low-pass filtering at the step 110 is performed, the ECU 10, at step 202, determines an inference value "$\alpha 1$" of the front-wheel slip angle from the lateral acceleration "Gy" in accordance with the above Equations (16) and (17).

In FIG. 14, the procedure to discriminate "drift-out" of the vehicle from the steering angle signal ($\delta$) includes the steps 100, 102, 104 and 106, the step 110, and the steps 114 and 116 which are the same as corresponding steps of the procedure in FIG. 9.

In this procedure, after the steps 100-106 are performed, the ECU 10, at step 300, reads a signal indicative of the steering angle $\delta$ generated by the steering angle sensor 20.

After the step 110 is performed, the ECU 10, at step 302, determines an inference value "$\alpha 1$" of the front-wheel slip angle from the steering angle "$\delta$" in accordance with the above Equations (18) and (19).

The above Equations (8) through (13) are used to determine the inference value "$\alpha 1$" of the front-wheel slip angle. Similarly, the equations for motion of the vehicle model in FIG. 10, which are used to determine an inference value "$\alpha 2$" of a rear-wheel slip angle, can be defined. Such equations includes equations which are the same as the above Equations (8), (9), (12) and (13), and equations which are different from the above Equations (10) and (11).

The charts shown in FIG. 11 and FIG. 12 are indicated by linear approximation of the slip-angle vs. lateral-force relationships of the front wheel and the rear wheel, respectively. Similarly, such approximations are used in order to simplify the calculations to determine the inference value "$\alpha 2$" of the rear-wheel slip angle. For use in the determination of the inference value "$\alpha 2$", the above Equations (10) and (11) are modified as follows.

$$F1 = K1 \cdot \alpha 1 \qquad (20)$$

$$F1 = K2 \cdot \alpha 2 \quad (0 \leq \alpha 2 \leq \alpha 2 max) \qquad (21)$$

$$= F2max \quad (\alpha 2 max \leq \alpha 2)$$

Accordingly, from the above Equations (8), (9), (12), (13), (20) and (21), the inference value "$\alpha 2$" of the rear-wheel slip angle can be expressed by using a transfer function Hr(s) and the yaw rate r, as follows.

$$(1) \; \alpha 2 = Hr(s) \cdot r \qquad (22)$$

$$Hr(s) = \{(-Jz+bma)s+amu\}/\{K2a+bK2+umsa\} \qquad (23)$$

Similarly, from the above Equations (8), (9), (12), (13), (20) and (21), the equations used to determine the inference value $\alpha 2$ of the rear-wheel slip angle can be derived by using a transfer function HGy(s) and the lateral acceleration Gy, as follows.

$$(2) \; \alpha 2 = HGy(s) \cdot Gy \qquad (24)$$

$$HGy(s) = -\{(-Jz + bma)s + amu\}/\{us^2Jz + \qquad (25)$$
$$(aK2b + b^2K2)s + bK2u + uK2a\}$$

Similarly, from the above Equations (8), (9), (12), (13), (20) and (21), the equations used to determine the inference value $\alpha 2$ of the rear-wheel slip angle can be derived by using a transfer function H$\delta$(s) and the steering angle $\delta$, as follows.

$$(3) \alpha 2 = H\delta(s) \cdot \delta \qquad (26)$$

$$H\delta(s) = -K1u\{(-Jz + bma)s + amu\}/\{u^2ms^2Jz + \qquad (27)$$
$$(umb^2K2 + K1Jzu + K2Jzu + uma^2K1)s - aK1mu^2 +$$
$$2aK1K2b + bK2mu^2 + K1b^2K2 + K2a^2K1\}$$

Therefore, if one of the vehicle behavior parameters including the yaw rate r, the lateral acceleration Gy and the steering angle δ, is detected, the dynamic behavior estimate system of the present invention can determine an inference value α2 of the rear-wheel slip angle from the above one of the vehicle behavior parameters in accordance with the above-mentioned equations.

In addition, if the rear-wheel maximum lateral force "F2max" and the rear-wheel cornering power "K2" are calculated by the above Equations (4) and (6), the maximum slip angle α2$_{max}$ can be determined by the following equation.

$$\alpha 2_{max} = F2max/K2 \tag{28}$$

Accordingly, if one of the vehicle behavior parameters including the yaw rate r, the lateral acceleration Gy and the steering angle δ is detected, the dynamic behavior estimate system of the present invention can discriminate "spin" of the vehicle when operating in a curved path by comparing the inference value α2 of the rear-wheel slip angle with the maximum slip angle α2$_{max}$.

Figure 15:
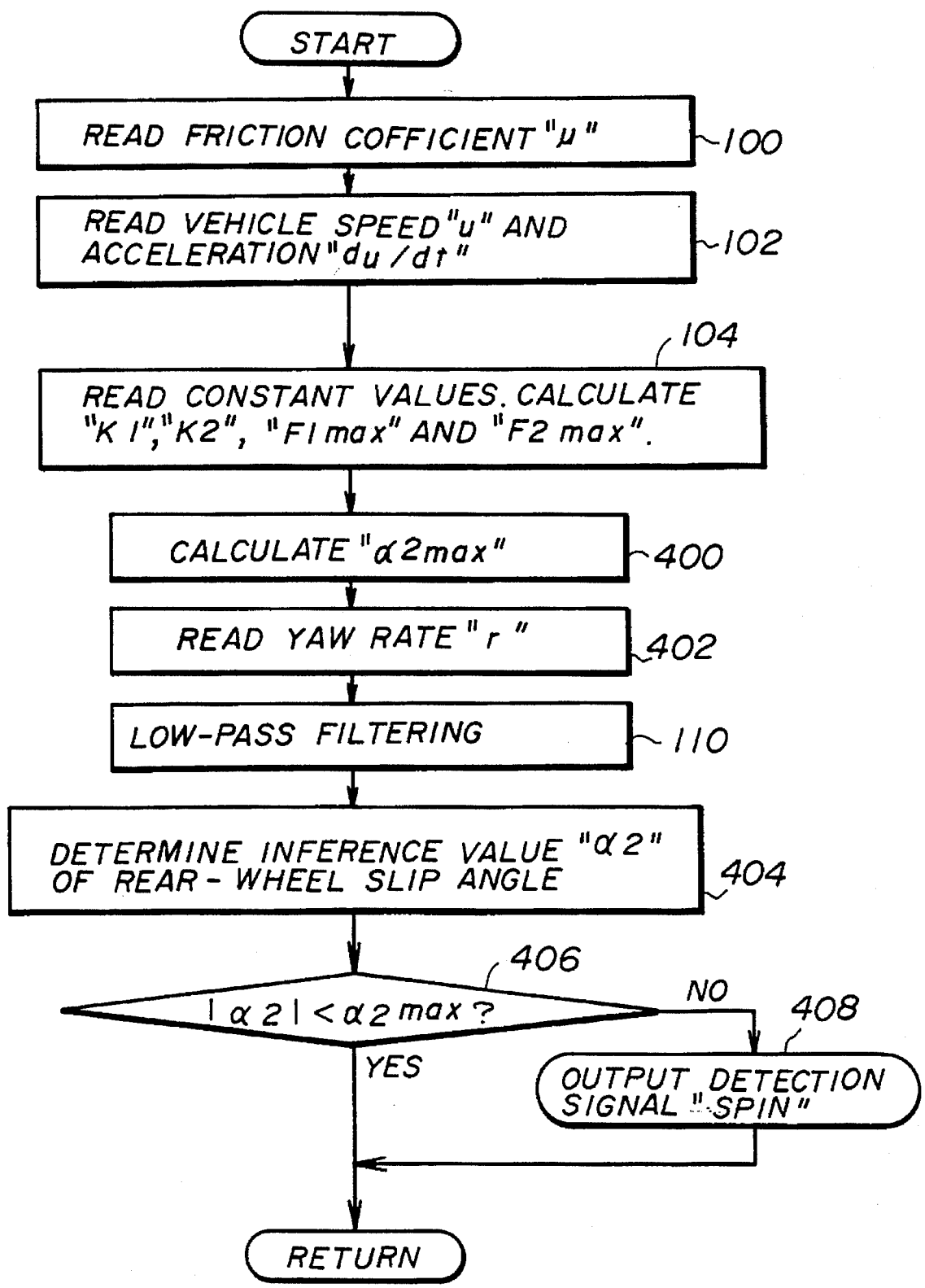
FIG. 15 is a flow chart for explaining a discrimination of "spin" of the vehicle performed using a signal output from the yaw rate sensor.

FIG. 15 shows a discrimination of "spin" of the vehicle performed by the ECU 10 using a signal output from the yaw rate sensor 16.

In FIG. 15, the procedure to discriminate "spin" of the vehicle from the yaw rate signal (r) includes the steps 100, 102 and 104, and the step 110 which are the same as corresponding steps of the procedure in FIG. 9, and a description thereof will be omitted.

In this procedure, after the steps 100–104 are performed, the ECU 10, at step 400, determines a maximum slip angle "α2$_{max}$" of the rear wheels from the "F2max" and the "K2" determined at the step 104 in accordance with the above Equation (28). The ECU 10, at step 402, reads a signal indicative of the yaw rate "r" generated by the yaw rate sensor 16.

After the step 110 is performed, the ECU, at step 404, determines an inference value "α2" of the rear-wheel slip angle from the yaw rate "r" in accordance with the above Equations (22) and (23).

After the inference value "α2" is determined, the ECU 10, at step 406, detects whether the absolute value |α2| of the determined inference value is smaller than the rear-wheel maximum slip angle "α2$_{max}$".

If the result at the step 406 is affirmative (|α2|<α2$_{max}$), it is determined that no "slip" of the vehicle occurs since the slip angle α and the lateral force F of the rear wheel have a linear relation and the rear wheel currently has a proper road holding ability. The procedure shown in FIG. 15 ends without outputting a detection signal indicative of "slip" of the vehicle.

If the result at the step 406 is negative (|α2|≥α2$_{max}$), it is determined that "slip" of the vehicle occurs since the slip angle α and the lateral force F of the rear wheel have a nonlinear relation and the rear wheel currently loses a proper road holding ability. The ECU 10, at step 408, outputs a detection signal indicative of "slip" of the vehicle. After the step 408 is performed, the procedure shown in FIG. 15 ends.

Figure 16:
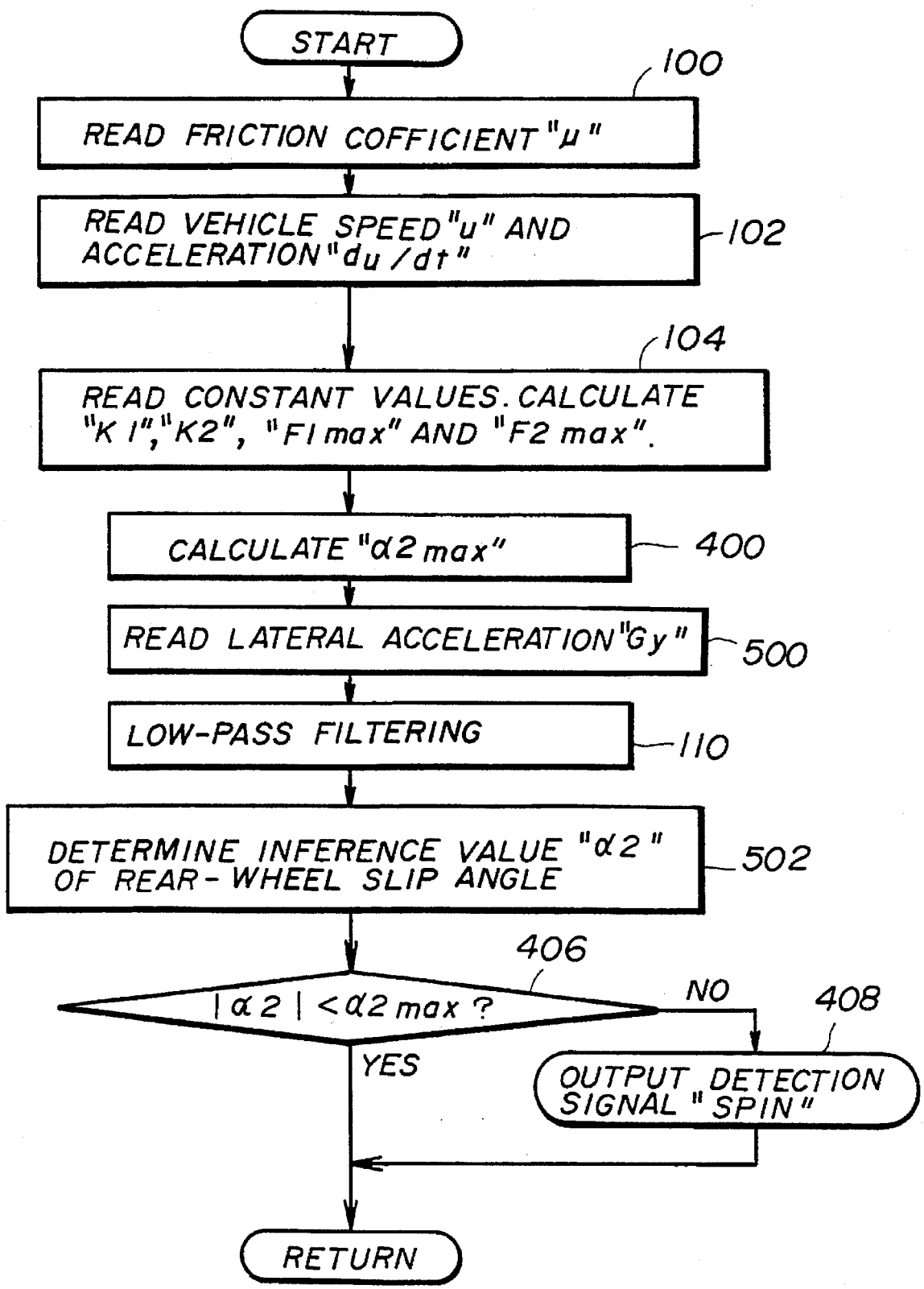
FIG. 16 is a flow chart for explaining a discrimination of "spin" of the vehicle performed using a signal output from the lateral acceleration sensor.

FIG. 16 shows a discrimination of "spin" of the vehicle performed by the ECU 10 using a signal output from the lateral acceleration sensor 18. In FIG. 16, the steps which are the same as corresponding steps in FIG. 15 are designated by the same reference numerals, and a description thereof will be omitted.

In the procedure shown in FIG. 16, after the step 400 is performed, the ECU 10, at step 500, reads a signal indicative of the lateral acceleration "Gy" generated by the lateral acceleration sensor 18.

After the step 110 is performed, the ECU 10, at step 502, determines an inference value "α2" of the rear-wheel slip angle from the lateral acceleration "Gy" in accordance with the above Equations (24) and (25).

Figure 17:
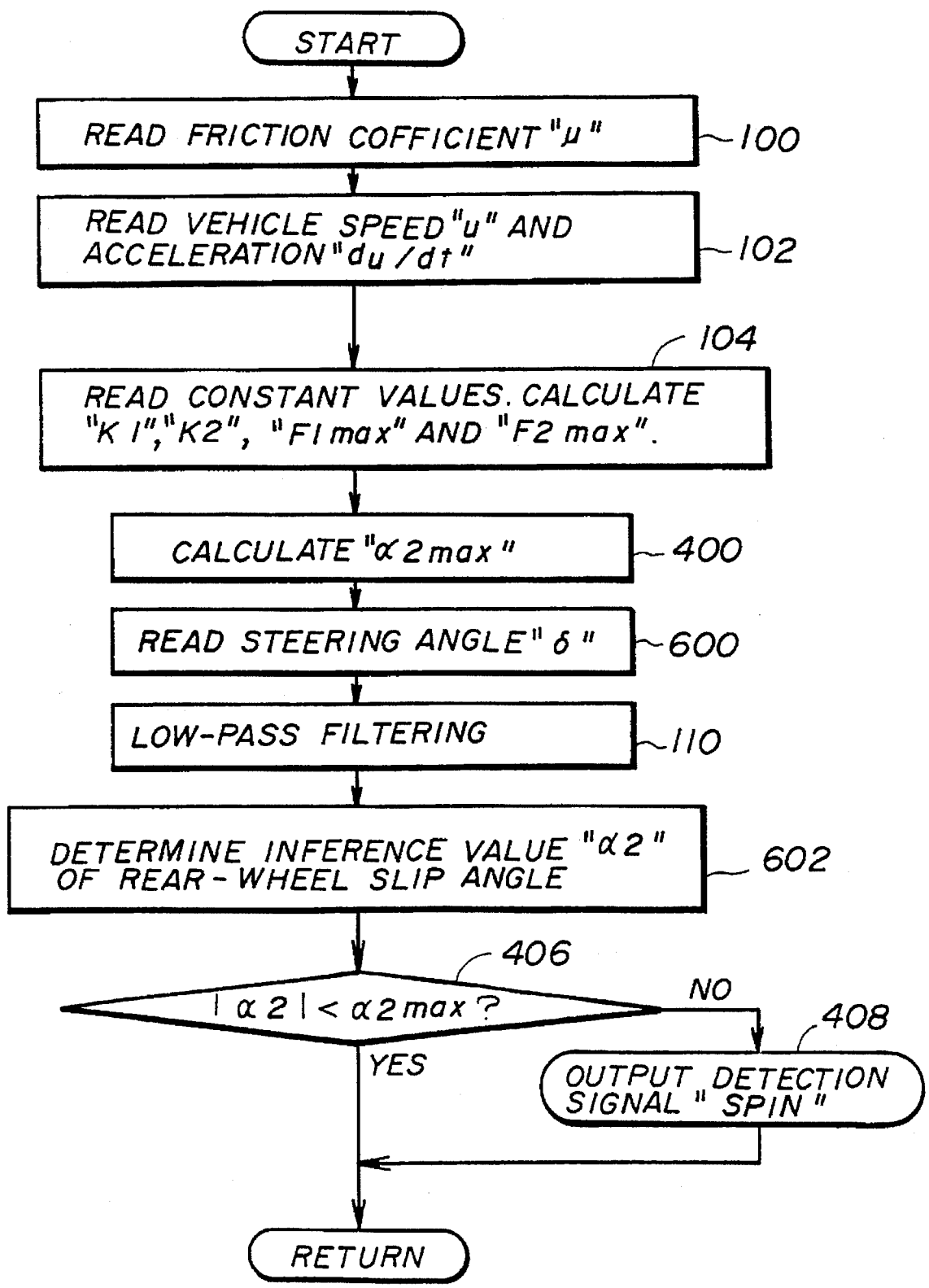
FIG. 17 is a flow chart for explaining a discrimination of "spin" of the vehicle performed using a signal output from the steering angle sensor.

FIG. 17 shows a discrimination of "spin" of the vehicle performed by the ECU 10 using a signal output from the steering angle sensor 20. In FIG. 17, the steps which are the same as corresponding steps in FIG. 15 are designated by the same reference numerals, and a description thereof will be omitted.

In the procedure shown in FIG. 17, after the step 400 is performed, the ECU 10, at step 600, reads a signal indicative of the steering angle "δ" generated by the steering angle sensor 20.

After the step 110 is performed, the ECU 10, at step 602, determines an inference value "α2" of the rear-wheel slip angle from the steering angle "δ" in accordance with the above Equations (26) and (27).

When one of the procedures shown in FIGS. 15, 16 and 17 is performed by the ECU 10, the dynamic behavior estimate system of the present invention discriminates "spin" of the vehicle based on only one of the vehicle behavior parameters including the yaw rate r, the lateral acceleration Gy and the steering angle δ. Therefore, both the discriminations of "drift-out" and "spin" of the vehicle when operating in a curved path can be carried out by the dynamic behavior estimate system of the present invention.

In addition, if at least one of the yaw rate sensor 16, the lateral acceleration sensor 18 and the steering angle sensor 20 is connected to the ECU 10, it is possible that the dynamic behavior estimate system in the above-described embodiment carries out both the discriminations of "drift-out" and "spin" of the vehicle.

Figure 18A:
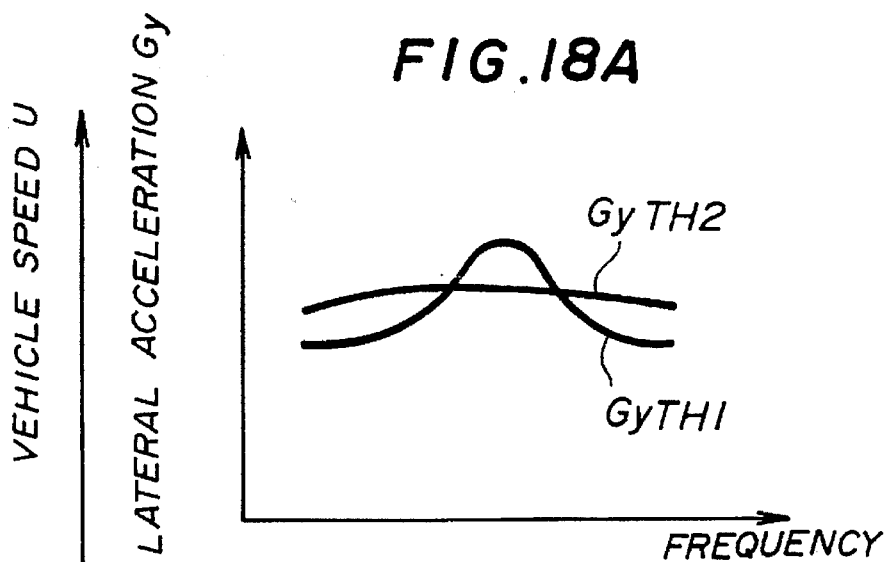
FIGS. 18A, 18B and 18C are characteristic charts of threshold values of front-wheel and rear-wheel lateral accelerations for different vehicle speeds.
Figure 18B:
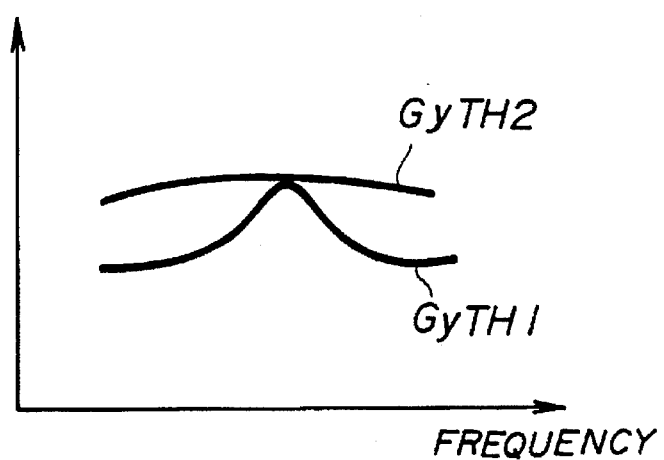
Figure 18C:
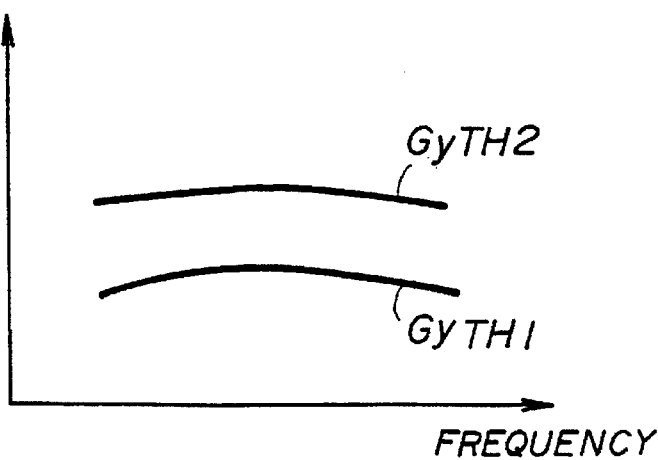

FIGS. 18A, 18B and 18C show characteristics of a threshold value "GyTH1" of front-wheel lateral acceleration and a threshold value "GyTH2" of rear-wheel lateral acceleration for different vehicle speeds "u". The abscissa indicates the frequency of the lateral acceleration "Gy". The characteristics in FIG. 18A are those when the vehicle speed "u" is high, the characteristics in FIG. 18B are those when the vehicle speed "u" is middle, and the characteristics in FIG. 18C are those when the vehicle speed "u" is low.

Generally, when the lateral acceleration Gy with respect to a wheel of the vehicle is below a threshold value, the wheel has a proper road holding ability and any instability of the vehicle does not occur. When the lateral acceleration Gy exceeds the threshold value, the wheel loses a proper road holding ability and an instability of the vehicle occurs.

As shown in FIGS. 18A, 18B and 18C, the threshold value "GyTH1" is always smaller than the threshold value "GyTH2" when the vehicle speed is low, and the threshold value "GyTH1" may sometimes exceed the threshold value "GyTH2" when the vehicle speed is high. In FIG. 18B, the characteristic curve "GyTH1" is tangential to the characteristic curve "GyTH2" at a certain frequency. Hereinafter, a vehicle speed in the case of FIG. 18B is called a critical vehicle speed "Vsp".

Therefore, if the vehicle speed "u" is smaller than the critical vehicle speed "Vsp", the front wheels of the vehicle will lose a road holding ability earlier than the rear wheels since the threshold value "GyTH1" of front-wheel lateral acceleration is always smaller than the threshold value "GyTH2" of rear-wheel lateral acceleration. In other words, "spin" of the vehicle never occurs in such a condition.

Accordingly, if a discrimination of "spin" of the vehicle is performed by the dynamic behavior estimate system of the present invention even when the vehicle speed "u" is below the critical vehicle speed "Vsp", the time needed for the calculations at such cycles is worthless. A speedy discrimination of instability of the vehicle when the vehicle rapidly accelerates cannot be realized.

Figure 19:
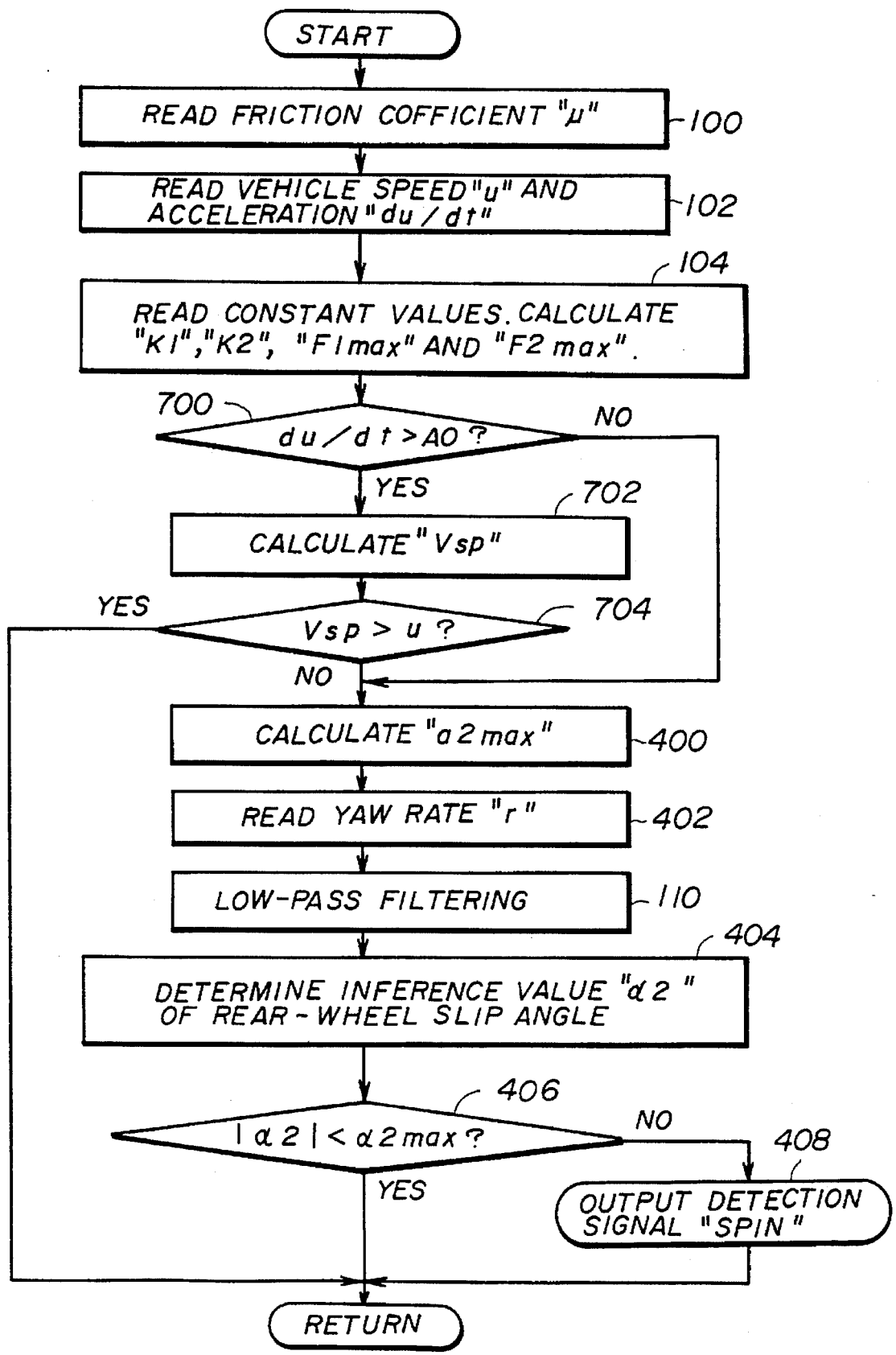
FIG. 19 is a flow chart for explaining an inhibition of the discrimination of "spin" of the vehicle performed when a vehicle speed is smaller than a critical vehicle speed.

FIG. 19 shows an inhibition of the discrimination of "spin" of the vehicle performed by the ECU when the vehicle speed is smaller than a critical vehicle speed. In order to eliminate the above-described problem, the procedure used to discriminate "spin" of the vehicle, shown in FIG. 15, is improved by this inhibition procedure. In the procedure shown in FIG. 19, the performance of the discrimination of "spin" of the vehicle by the ECU 10 is inhibited when the vehicle speed is below the critical vehicle speed.

In FIG. 19, the steps used to discriminate "spin" of the vehicle from the yaw rate "r", which are the same as corresponding steps in FIG. 15, are designated by the same reference numerals, and a description thereof will be omitted.

In the procedure of FIG. 19, after the step 104 is performed, the ECU 10, at step 700, detects whether the acceleration "du/dt" of the vehicle is greater than a reference value "A0". In this step, it is determined whether a change in the vehicle speed "u" within a unit time is great enough to start the inhibition or not.

If the result at the step 700 is negative, the inhibition is not started. The ECU 10 at the step 400 determines the maximum slip angle "$\alpha 2_{max}$" of the rear wheel.

If the result at the step 700, the ECU 10, at step 702, determines the critical vehicle speed "Vsp".

As described above, the critical vehicle speed "Vsp" is a vehicle speed when the requirement that the characteristic curve "GyTH1" is tangential to the characteristic curve "GyTH2", as shown in FIG. 18B, is met.

When the vehicle model shown in FIG. 10 is applied, the critical vehicle speed "Vsp" can be defined as follows.

$$Vsp = JK2/2a^2 \{(1/m + b^2/J)^2 - (1/m - ab/J)^2\} \cdot [b + \sqrt{\{b^2 - a^2(F1max/F2max)^2\}} \quad ] \quad (29)$$

By substituting the constant values and the determined values, obtained at the step 104, into the above Equation (29), the critical vehicle speed "Vsp" can be determined. Thus, the ECU 10, at the step 702, determines the critical vehicle speed "Vsp" in accordance with the above Equation (29).

After the "Vsp" is determined, the ECU 10, at step 704, detects whether the vehicle speed "u" is smaller than the critical vehicle speed "Vsp".

If the result at the step 704 is affirmative, it is determined that "spin" of the vehicle never occur, and the discrimination of "spin" of the vehicle is inhibited. The routine at the present cycle immediately ends and the subsequent steps after the step 704 are not performed by the ECU 10. The time needed for the calculations at the present cycle can be saved by taking a short cut.

If the result at the step 704 is negative, it is determined that "spin" of the vehicle is possible. The ECU 10 performs the subsequent steps after the step 704 to discriminate "spin" of the vehicle. Thus, it is possible that the dynamic behavior estimate system of the present invention carries out a speedy discrimination of "spin" of the vehicle when the vehicle rapidly accelerates.

Figure 1:
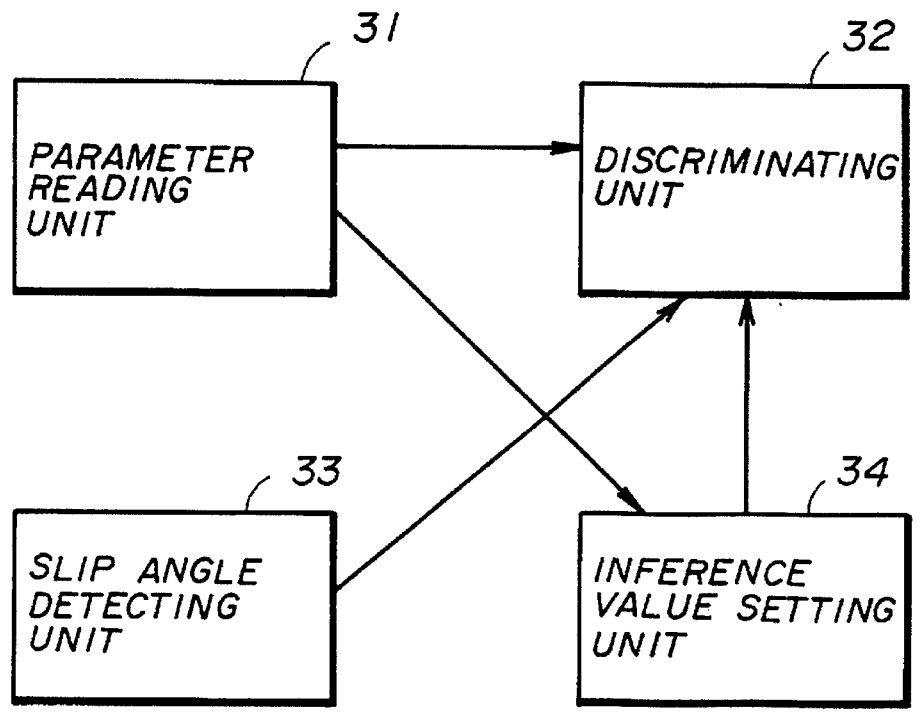
FIG. 1 is a block diagram which shows one aspect of the present invention.

FIG. 1 shows a dynamic behavior estimate system of an automotive vehicle in one aspect of the present invention. In this dynamic behavior estimate system, a reading unit 31 reads a signal indicative of one of vehicle behavior parameters when the vehicle operates in a curved path. A discriminating unit 32 discriminates an instability of the vehicle when an inference value from the above one of the vehicle behavior parameters indicated by the signal exceeds a reference value. A slip angle detecting unit 33, coupled to the discriminating unit 32, detects a maximum slip angle that can hold a lateral force of rear wheels of the vehicle below a critical value and sets the reference value equal to the maximum slip angle. An inference value setting unit 34, which is responsive to the signal from the parameter reading unit 31, determines the inference value from the above one of the vehicle behavior parameters indicated by the signal.

In the dynamic behavior estimate system in FIG. 1, the parameter reading unit 31 is realized by any of the steps 108, 200, 300, 402, 500 and 600 performed by the ECU 10, the discriminating unit 32 is realized by the steps 406 and 408 performed by the ECU 10, the slip angle detecting unit 33 is realized by the step 400 performed by the ECU 10, and the inference value setting unit 34 is realized by the step 404 performed by the ECU 10.

Figure 2:
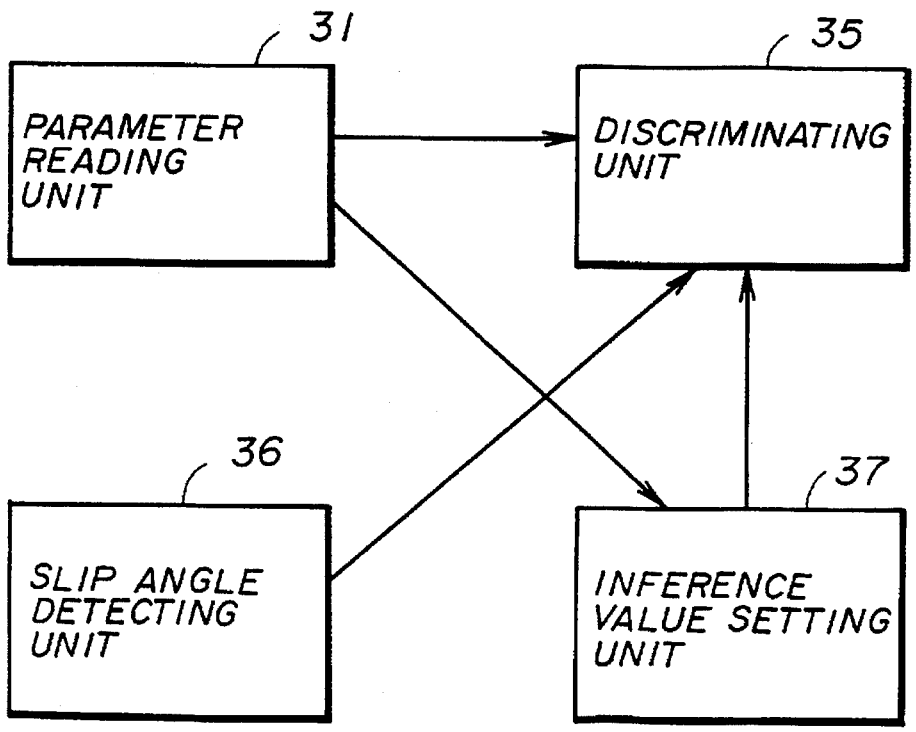
FIG. 2 is a block diagram shows another aspect of the present invention.

FIG. 2 shows a dynamic behavior estimate system of an automotive vehicle in another aspect of the present invention. In this dynamic behavior estimate system, the parameter reading unit 31 is the same as that shown in FIG. 1, and it reads a signal indicative of one of vehicle behavior parameters when the vehicle operates in a curved path. A discriminating unit 35 discriminates an instability of the vehicle when an inference value from the above one of the vehicle behavior parameters indicated by the signal exceeds a reference value. A slip angle detecting unit 36, coupled to the discriminating unit 35, detects a maximum slip angle that can hold a lateral force of front wheels of the vehicle below a critical value and sets the reference value equal to the maximum slip angle. An inference value setting unit 37, which is responsive to the signal from the parameter reading unit 31, determines the inference value from the above one of the vehicle behavior parameters indicated by the signal.

In the dynamic behavior estimate system in FIG. 2, the parameter reading unit 31 is realized by any of the steps 108, 200, 300, 402, 500 and 600 performed by the ECU 10, the discriminating unit 35 is realized by the steps 114 and 116 performed by the ECU 10, the slip angle detecting unit 36 is realized by the step 106 performed by the ECU 10, and the inference value setting unit 37 is realized by the step 112 performed by the ECU 10.

Figure 3:
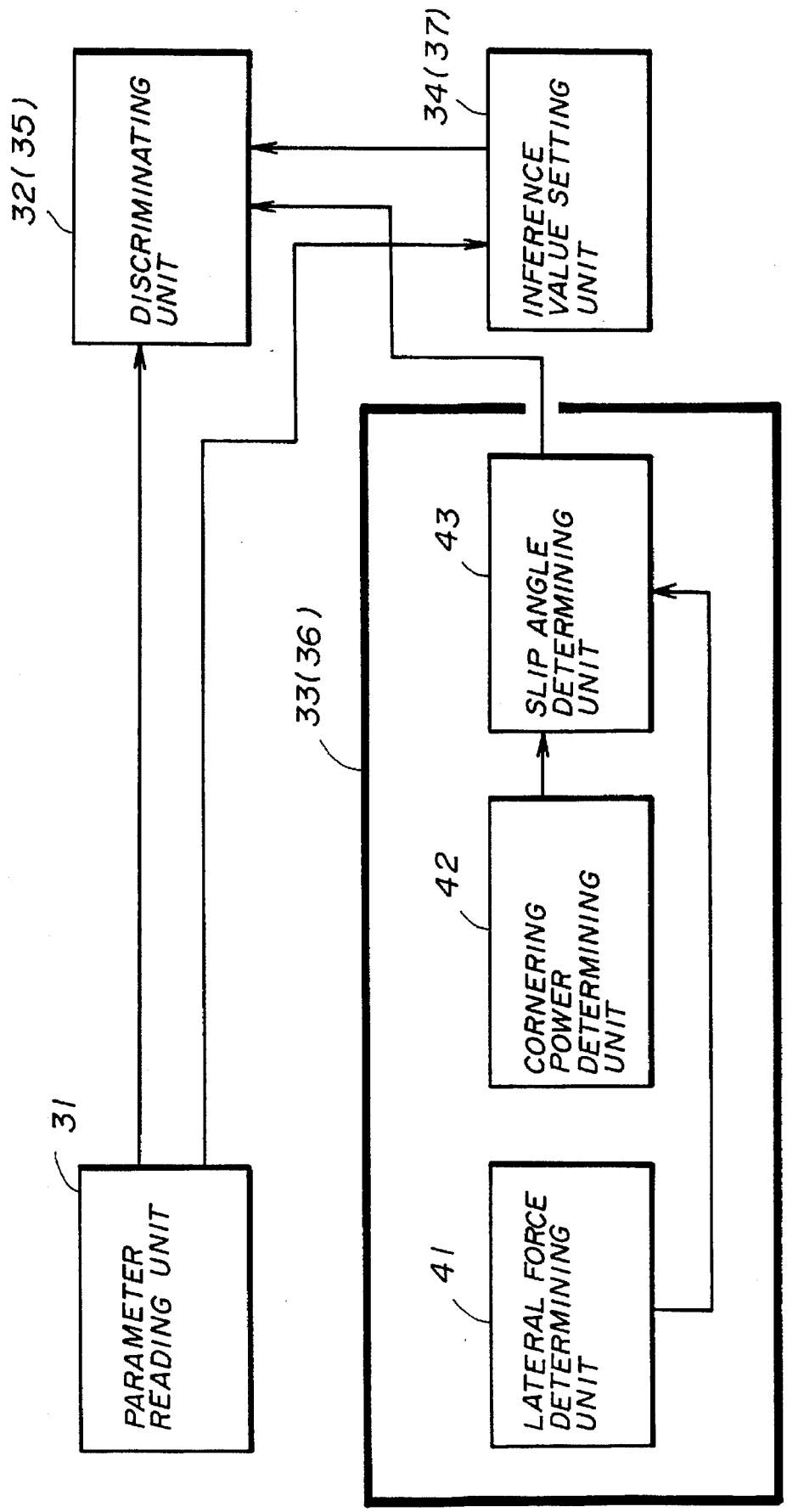
FIG. 3 is a block diagram which shows still another aspect of the present invention.

FIG. 3 shows a dynamic behavior estimate system of an automotive vehicle in still another aspect of the present invention. In this dynamic behavior estimate system, the parameter reading unit 31, the discriminating unit 32 (or 35) and the inference value setting unit 34 37) are the same as corresponding units in FIG. 1 or FIG. 2. The slip angle detecting unit 33 (or 36) includes a lateral force determining unit 41, a cornering power determining unit 42, and a slip angle determining unit 43.

The lateral force determining unit 41 determines the front-wheel maximum lateral force "F1max" or the rear-wheel maximum lateral force "F2max". The cornering power determining unit 42 determines the front-wheel cornering power "K1" or the rear-wheel cornering power "K2". The slip angle determining unit 43 determines the front-wheel maximum slip angle "$\alpha 2_{max}$" or the rear-wheel maximum slip angle "$\alpha 2_{max}$" based on the determined values of "F1max", "F2max", "K1" and "K2" from the lateral force determining unit 41 and the cornering power determining unit 42.

In the dynamic behavior estimate system in FIG. 3, the lateral force determining unit 41 is realized by the determinations of the front-wheel and rear-wheel maximum lateral forces "F1max" and "F2max" at the step 104 performed by the ECU 10, the cornering power determining unit 42 is realized by the determinations of the front-wheel and rear-wheel cornering powers "K1" and "K2" at the step 104 performed by the ECU 10, and the slip angle determining unit 43 is realized by the determination of the maximum slip angle "$\alpha 1_{max}$" or "$\alpha 2_{max}$" based on the determined values of "F1max", "F2max", "K1" and "K2" at the steps 106 and 400 performed by the ECU 10.

Figure 4:
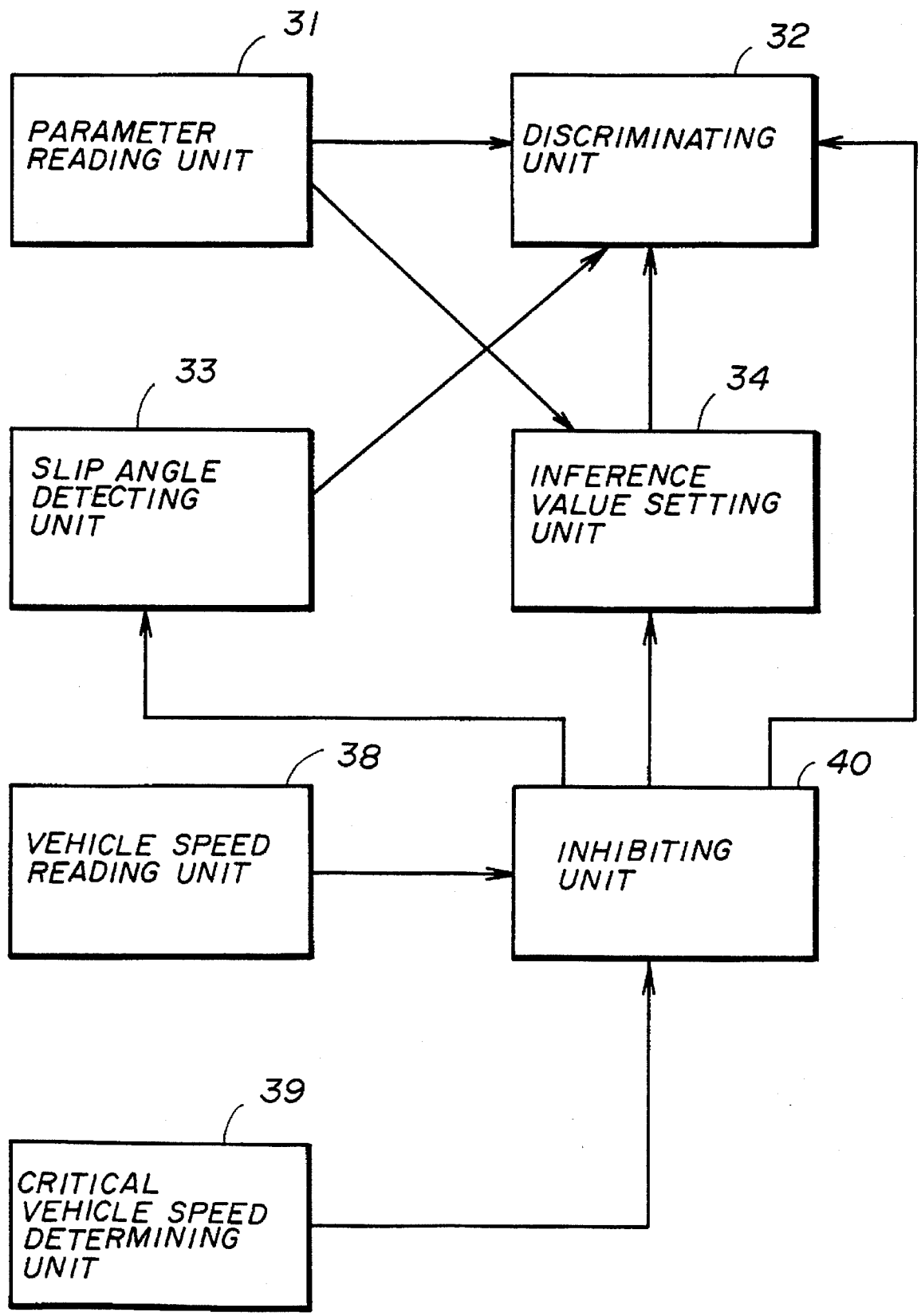
FIG. 4 is a block diagram which shows a further aspect of the present invention.

FIG. 4 shows a dynamic behavior estimate system of an automotive vehicle in a further aspect of the present invention. In this dynamic behavior estimate system, the parameter reading unit 31, the discriminating unit 32, the slip angle detecting unit 33, and the inference value setting unit 34 are the same as corresponding units in FIG. 1. This dynamic behavior estimate system further includes a vehicle speed reading unit 38, a critical vehicle speed determining unit 39, and an inhibiting unit 40.

The vehicle speed reading unit 38 reads a signal indicative of a vehicle speed "u" of the vehicle. The critical vehicle speed determining unit 38 determines a critical vehicle speed "Vsp" in accordance with a predetermined formula. The inhibiting unit 40 inhibits the discrimination of the instability of the vehicle by the discriminating unit 32 when the vehicle speed "u" is smaller than the critical vehicle speed "Vsp". In addition, the inhibiting unit 40 inhibits the detection of the maximum slip angle by the slip angle detecting unit 33 under the same condition of the vehicle speed. In addition, the inhibiting unit 40 inhibits the determination of the inference value by the inference value setting unit 34 under the same condition of the vehicle speed.

In the dynamic behavior estimate system in FIG. 4, the vehicle speed reading unit 38 is realized by the step 102 being performed by the ECU 10, the critical vehicle speed determining unit 39 is realized by the step 702 being performed by the ECU 10, and the inhibiting unit 40 is realized by the step 704 being performed by the ECU 10.

In the above-described embodiments, an inference value ($\alpha 1$ or $\alpha 2$) is determined based on one of the vehicle behavior parameters (r, Gy, $\delta$), and the inference value is compared with the maximum slip angle ($\alpha 1_{max}$ or $\alpha 2_{max}$) in order to discriminate an instability of the vehicle. However, the method of the comparison is not limited to the above-described embodiment. For example, another conceivable method is that the maximum slip angle ($\alpha 1_{max}$ or $\alpha 2_{max}$) is converted into another value by a suitable conversion, and the value after the conversion is compared directly with one of the vehicle behavior parameters.

Further, the present invention is not limited to the above-described embodiments, and variations and modifications may be made without departing from the scope of the present invention.

What is claimed is:

1. A dynamic behavior estimate system of an automotive vehicle which discriminates an instability of the vehicle, comprising:

parameter reading means for reading a signal indicative of one of vehicle behavior parameters with respect to the vehicle when operating in a curved path;

discriminating means for outputting a detection signal indicative of discrimination of an instability of the vehicle when a value from said one of the vehicle behavior parameters indicated by said signal exceeds a reference value;

slip angle detecting means, coupled to said discriminating means, for detecting a maximum slip angle that can hold a lateral force of rear wheels of the vehicle below a critical value, and for setting the reference value equal to said maximum slip angle; and inference value setting means for determining an inference value from said one of the vehicle behavior parameters indicated by said signal, and for setting said value, used by said discriminating means, equal to the inference value, thereby allowing said discriminating means to detect whether the inference value exceeds the reference value.

2. The dynamic behavior estimate system according to claim 1, wherein said slip angle detecting means comprises:

lateral force determining means for determining a maximum lateral force of the rear wheels based on a vehicle speed detected by a vehicle speed sensor and based on a friction coefficient detected by a friction coefficient detector;

cornering power determining means for determining a cornering power of the rear wheels based on the vehicle speed detected by the vehicle speed sensor; and slip angle determining means for determining the maximum slip angle of the rear wheels from the maximum lateral force determined by said lateral force determining means and from the cornering power determined by said cornering power determining means.

3. The dynamic behavior estimate system according to claim 1, wherein said slip angle detecting means detects a rear-wheel maximum slip angle based on a linear approximation of a relationship between a rear-wheel slip angle and a rear-wheel lateral force.

4. The dynamic behavior estimate system according to claim 1, further comprising:

vehicle speed reading means for reading a signal indicative of a vehicle speed generated by a vehicle speed sensor;

critical vehicle speed determining means for determining a critical vehicle speed that does not cause the instability of the vehicle to occur, in accordance with a predetermined formula;

inhibiting means, coupled to said discriminating means, for inhibiting the discrimination of the instability of the vehicle by said discriminating means when the vehicle speed read by said vehicle speed reading means is smaller than the critical vehicle speed determined by said critical vehicle speed determining means.

5. The dynamic behavior estimate system according to claim 4, wherein said inhibiting means inhibits the detection of the maximum slip angle by said slip angle detecting means when the vehicle speed read by said vehicle speed reading means is smaller than the critical vehicle speed determined by said critical vehicle speed determining means.

6. The dynamic behavior estimate system according to claim 4, wherein said inhibiting means inhibits the determination of the inference value by said inference value setting means when the vehicle speed read by said vehicle speed reading means is smaller than the critical vehicle speed determined by said critical vehicle speed determining means.

7. The dynamic behavior estimate system according to claim 1, wherein said inference value setting means determines an inference value of a rear-wheel slip angle from a yaw rate signal indicative of a rear-wheel yaw rate generated by a yaw rate sensor.

8. The dynamic behavior estimate system according to claim 1, wherein said inference value setting means determines an inference value of a rear-wheel slip angle from a lateral acceleration signal indicative of a rear-wheel lateral acceleration generated by a lateral acceleration sensor.

9. The dynamic behavior estimate system according to claim 1, wherein said inference value setting means determines an inference value of a rear-wheel slip angle from a steering angle signal indicative of a steering angle generated by a steering angle sensor.

10. A dynamic behavior estimate system of an automotive vehicle which discriminates an instability of the vehicle, comprising:

parameter reading means for reading a signal indicative of one of vehicle behavior parameters with respect to the vehicle when operating in a curved path;

discriminating means for outputting a detection signal indicative of discrimination of an instability of the vehicle when a value from said one of the vehicle behavior parameters indicated by said signal exceeds a reference value;

slip angle detecting means, coupled to said discriminating means, for detecting a maximum slip angle that can hold a lateral force of front wheels of the vehicle below a critical value, and for setting the reference value equal to said maximum slip angle; and inference value setting means for determining an inference value from said one of the vehicle behavior parameters indicated by said signal, and for setting said value, used by said discriminating means, equal to the inference value, thereby allowing said discriminating means to detect whether the inference value exceeds the reference value.

11. The dynamic behavior estimate system according to claim 10, wherein said slip angle detecting means comprises:

lateral force determining means for determining a maximum lateral force of the front wheels based on a vehicle speed detected by a vehicle speed sensor and based on a friction coefficient detected by a friction coefficient detector;

cornering power determining means for determining a cornering power of the front wheels based on the vehicle speed detected by the vehicle speed sensor; and slip angle determining means for determining the maximum slip angle from the maximum lateral force determined by said lateral force determining means and from the cornering power determined by said cornering power determining means.

12. The dynamic behavior estimate system according to claim 10, wherein said slip angle detecting means detects a front-wheel maximum slip angle based on a linear approximation of a relationship between a front-wheel slip angle and a front-wheel lateral force.

13. The dynamic behavior estimate system according to claim 10, wherein said inference value setting means determines an inference value of a front-wheel slip angle from a yaw rate signal indicative of a front-wheel yaw rate generated by a yaw rate sensor.

14. The dynamic behavior estimate system according to claim 10, wherein said inference value setting means determines an inference value of a front-wheel slip angle from a lateral signal indicative of a front-wheel lateral acceleration generated by a lateral acceleration sensor.

15. The dynamic behavior estimate system according to claim 10, wherein said inference value setting means determines an inference value of a front-wheel slip angle from a steering signal indicative of a front-wheel steering angle generated by a steering angle sensor.

* * * * *